United States Patent
Kaneko et al.

(10) Patent No.: US 6,525,707 B1
(45) Date of Patent: Feb. 25, 2003

(54) LIQUID CRYSTAL DISPLAY DEVICE AND ITS DRIVING METHOD

(75) Inventors: Yasushi Kaneko, Sayama (JP); Kazuhiko Yoshikawa, Kamakura (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/355,201

(22) PCT Filed: Nov. 27, 1998

(86) PCT No.: PCT/JP98/05334

§ 371 (c)(1),
(2), (4) Date: Jul. 26, 1999

(87) PCT Pub. No.: WO99/28781

PCT Pub. Date: Jun. 10, 1999

(51) Int. Cl.⁷ .................................................. G09G 3/36
(52) U.S. Cl. ............................. 345/88; 345/78; 345/87; 345/102; 345/50; 345/89; 345/150; 349/78; 349/79; 349/80; 349/81; 349/82; 349/96
(58) Field of Search ............................... 345/50, 88, 102, 345/150, 87, 96; 349/19, 29, 68, 118, 119, 102, 151, 77–81; 348/742, 19, 29, 30, 61, 68; 368/84–71

(56) References Cited

U.S. PATENT DOCUMENTS

| | | | | |
|---|---|---|---|---|
| 4,488,818 A | * | 12/1984 | Saurer et al. | 368/71 |
| 5,570,211 A | * | 10/1996 | Hanaoka et al. | 359/53 |
| 5,636,185 A | * | 6/1997 | Brewer et al. | 368/84 |
| 5,995,456 A | * | 11/1999 | Brewer et al. | 368/84 |
| 6,067,136 A | * | 5/2000 | Yamaguchi et al. | 349/96 |
| 6,151,004 A | * | 5/2000 | Kaneko | 345/88 |
| 6,181,309 B1 | * | 5/2000 | Mori et al. | 345/88 |
| 6,141,068 A | * | 10/2000 | Iijima | 349/96 |
| 6,147,934 A | * | 11/2000 | Arikawa et al. | 368/84 |
| 6,169,708 B1 | * | 1/2001 | Kaneko et al. | 368/84 |
| 6,201,529 B1 | * | 3/2001 | Shimizu | 345/150 |
| 6,259,421 B1 | * | 7/2001 | Yokota et al. | 345/33 |

FOREIGN PATENT DOCUMENTS

| | | |
|---|---|---|
| JP | 8-292434 | 11/1996 |
| JP | 9-54300 | 2/1997 |
| JP | 9-54316 | 2/1997 |
| JP | 9-54317 | 2/1997 |
| JP | 9-68613 | 3/1997 |
| JP | 9-258214 | 10/1997 |

* cited by examiner

Primary Examiner—Richard Hjerpe
Assistant Examiner—Ali Zomani
(74) Attorney, Agent, or Firm—Armstrong, Westerman & Hattori, LLP

(57) ABSTRACT

A liquid crystal display device capable of displaying in multiple colors, and a method for driving the liquid crystal display device using a typical monochrome liquid crystal driving IC. A display portion of a birefringence color liquid crystal display device has a usual letter display portion (41) for displaying letters in a single color and a mark display portion (42) for displaying a variety of colors. A liquid crystal cell is driven by supplying scanning signals to scanning electrodes for the letter display portion (41) and data signals to scanning electrodes for the mark display portion (42).

20 Claims, 15 Drawing Sheets

FIG.19

| DATA ELECTRODE | SUPPLIED SIGNAL | C5 COMBINATION WAVEFORM |
|---|---|---|
| D1 | OFF OFF OFF OFF (3V/0V/-3V) | V4=2.0V |
| D2 | OFF OFF OFF ON (3V/0V/-3V) | V3=1.73V |
| D3 | OFF ON OFF ON (3V/0V/-3V) | V2=1.41V |
| D4 | ON ON ON OFF (3V/0V/-3V) | V1=1.0V |
| D5 | ON ON ON ON (3V/0V/-3V) | V0=0V |

LIQUID CRYSTAL DISPLAY DEVICE AND ITS DRIVING METHOD

TECHNICAL FIELD

This invention relates to a liquid crystal display device and its driving method, and, more particularly, to constitution of a birefringence color liquid crystal display device and a driving method for a liquid crystal cell thereof.

BACKGROUND TECHNOLOGY

Conventionally, liquid crystal display devices typically use a reflection-type liquid crystal display device which displays in monochrome employing a TN (twisted nematic) liquid crystal cell or an STN (super twisted nematic) liquid crystal cell. Generally, a transflective reflector is utilized as a reflector of a liquid crystal display device, and a backlight unit, such as an electro-luminescent (EL) light and a light emitting diode (LED) array, is provided outside the transflective reflector for visibility of the time display at night.

Recently, watches equipped with liquid crystal display device, portable tape recorders, cellular phones, portable game machines or the like are coming into fashonable, so a liquid crystal display device capable of colorful displaying is desired for them. Then, for example, a digital timepiece capable of color displaying by using a single-color liquid crystal display device which indicates white letters or the like on a blue or red background through a color polarizing film dyed with a dichroic pigment, has been developed.

However, for developing a timepiece that is more fashionable in design and portable machines that have stronger impact in appearance, it is not enough to use a single-color display device. Then, it is desired to provide a multi-color display device capable of displaying a plurality of colors.

It is proposed to mount a birefringence color liquid crystal display device in a timepiece or other portable machines to perform a multicolor display with the birefringence effect of liquid crystal by changing the voltage applied to a liquid crystal cell instead of using a color filter.

In order to change colors on a letter (in case of a watch, numerals to display normal time, an alarm time and a calendar) display portion using the birefringence color liquid crystal display device, RMS voltage of the signal supplied to the letter display portion must be variable. In order to change the effective value, an IC for driving liquid crystal that is capable of controlling gray scale is required, this results in an increase of development cost and an extension of the time period for development. Moreover, the complexity of driving circuits increases the size of the driver IC and the amount of current consumed.

DISCLOSURE OF THE INVENTION

As regards a birefringence color liquid crystal display device displaying in a multi-color, it is an object of the present invention to provide a way to display in a multi-color easily in which the birefringence color liquid crystal display cell is driven by a typical monochrome liquid crystal driving IC without a gray scale function for simple multi-color display at a low cost and low power consumption.

To attain the aforementioned object, the present invention provides a configuration for a liquid crystal display device, consisting of: a liquid crystal cell in which nematic liquid crystal is sandwiched and filled in a gap between a transparent first substrate, having first electrodes, and a transparent second substrate, having second electrodes; a pair of polarizing films respectively arranged on and under the liquid crystal cell; and a reflector arranged on a face of one of the polarizing films which is on the opposite side to the liquid crystal cell.

The display portion made up of the liquid crystal display cell consists of a letter display portion displaying in a single color and a mark display portion displaying in a plurality of colors.

A liquid crystal cell driving circuit for driving the liquid crystal display device to supply scanning signals to the first electrodes for the letter display portion, data signals to the first electrodes for the mark display portion, and data signals to the second electrodes for both the letter display portion and the mark display portion, is provided.

The reflector of the liquid crystal display device may be a transflective reflector. And a backlight unit for lighting the liquid crystal elements through the transflective reflector may be preferably provided on the opposite side of the reflector to the liquid crystal cell.

A retardation film or a twisted retardation film may be provided between the liquid crystal cell and the polarizing film positioned on the visible side thereof in the liquid crystal display device.

The liquid crystal cell is preferably an STN liquid crystal cell in which the nematic liquid crystal is aligned at a twist angle in the range from 180° to 270°. Accordingly, a Δnd value which is the product of a value Δn in the birefringence of the liquid crystal and a gap d of the liquid crystal cell, preferably ranges from 1300 nm to 1600 nm.

In case of the above-mentioned liquid crystal display device having the retardation film, the liquid crystal cell is, preferably, an STN liquid crystal cell in which the nematic liquid crystal is aligned at a twist angle in the range from 180° to 270°. Accordingly, a Δnd value which is the product of a value Δn in the birefringence of the liquid crystal and a gap d of the liquid crystal cell, preferably ranges from 1500 nm to 1800 nm, and a retardation value of the retardation film desirably ranges from 1600 nm to 1900 nm.

It is advisable that the retardation film forms relations of nx>nz>ny, where nx is the refractive index of the direction of a phase delay axis, ny is the refractive index in a direction orthogonal to the phase delay axis, and nz is the refractive index in a thickness direction.

In the use of the liquid crystal display device mentioned above having the twisted retardation film, the liquid crystal cell is, preferably, an STN liquid crystal cell in which the nematic liquid crystal is aligned at a twist angle in the range from 180° to 270°. Accordingly, a Δnd value which is the product of a value Δn in the birefringence of the liquid crystal and a gap d of the liquid crystal cell, preferably ranges from 1500 nm to 1800 nm. A Δnd value of the twisted retardation film preferably ranges from 1400 nm to 1800 nm.

Another liquid crystal display device according to the present invention has: a first liquid crystal display device consisting of a first liquid crystal cell in which nematic liquid crystal is sandwiched and filled in a gap between a transparent first substrate having first electrodes and a transparent second substrate having second electrodes, a pair of polarizing films respectively arranged on and under the first liquid crystal cell, and a reflector arranged on a face of one of the polarizing films which is on the opposite side to the liquid crystal cell;

a second liquid crystal display device, arranged on a face of the first liquid crystal display device on the visible side, consisting of a second liquid crystal cell in which nematic liquid crystal is sandwiched and filled in a gap between a transparent first substrate having first electrodes and a transparent second substrate having second electrodes, and a third polarizing film arranged on a face of the second liquid crystal cell on the visible side; and a liquid crystal cell driving circuit for driving the first and second liquid crystal display devices to supply scanning signals to the first electrodes of the first liquid crystal cell, data signals to the second electrodes of the first liquid crystal cell, and data signals to the first electrodes and the second electrodes of the second crystal liquid cell.

It is advisable that the second liquid crystal display device has a reflection-type polarizing film on the opposite side of the second liquid crystal cell from the visible side.

A driving method of the liquid crystal display device according to the present invention is for a birefringence color liquid crystal display device, as described hereinbefore, which consists of: a liquid crystal cell in which nematic liquid crystal is sandwiched and filled in a gap between a transparent first substrate having first electrodes and a transparent second substrate having second electrodes; a pair of polarizing films respectively arranged on and under the liquid crystal cell; and a reflector arranged on a face of one of the polarizing films, the face being on the opposite side to the liquid crystal cell, and in which a display portion thereof has a letter display portion displaying in a single color and a mark display portion displaying in a plurality of colors.

According to the method, the aforementioned liquid crystal cell is driven by supplying scanning signals to the first electrodes for the letter display portion; supplying data signals to the first electrodes for the mark display portion; and supplying data signals to the second electrodes for both the letter display portion and the mark display portion.

The present invention also provides a method for driving a liquid crystal display device which comprises: a first liquid crystal display device consisting of a first liquid crystal cell in which nematic liquid crystal is sandwiched and filled in a gap between a transparent first substrate having first electrodes and a transparent second substrate having second electrodes, a pair of polarizing films respectively arranged on and under the first liquid crystal cell, and a reflector arranged on a face of one of the polarizing films, the face being on the opposite side to the liquid crystal cell; and a second liquid crystal display device arranged on the visible side of the first liquid crystal display device and consisting of a second liquid crystal cell in which nematic liquid crystal is sandwiched and filled in a gap between a transparent first substrate having a first electrode and a transparent second substrate having a second electrode, and a third polarizing film arranged on a face of the second liquid crystal cell on the visible side. According to the method, the first and second liquid crystal cells are driven by supplying scanning signals to the first electrodes of the first liquid crystal cell while supplying data signals to the second electrodes thereof; and supplying data signals to the first electrode and the second electrode of the second liquid crystal cell.

BRIEF DESCRIPTION OF DRAWINGS

FIG. 19 is a waveform table showing signals assigned to the respective data electrodes D1 to D5 shown in FIG. 17, and combination waveforms with the signals supplied to the scanning electrode C5;

BEST MODE FOR CARRYING OUT THE INVENTION

Preferred embodiments for carrying out the present invention will be described hereinafter with references to the accompanying drawings.

First Embodiment: FIGS. 1 to 10

The first embodiment according to the present invention will be detailed with references to FIG. 1 to FIG. 10.

Figure 1:
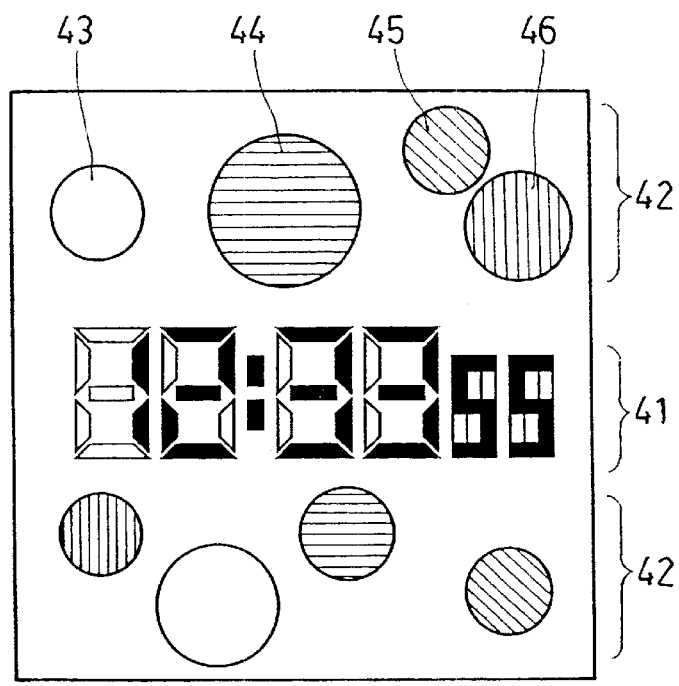
FIG. 1 is a plane view showing a display portion of a liquid crystal display device of a first embodiment according to the present invention.

Examples of display pattern on the display portion of a liquid crystal display device of the first embodiment are described with reference to the plane view of FIG. 1. The display portion of the liquid crystal display device 17 consists of a letter display portion 41 displaying current time and alarm time in digital form and mark display portions 42 respectively formed above and under the time display portion 41, as shown in FIG. 1. The mark display portions 42 are each composed of a plurality of circular patterns 43 to 46 showing multiple colors for representing a colorful display. The letter display portion 41 does not change color, but always displays time in a predetermined color.

The mark display portions 42 display in different colors on the respective circular patterns, and the color is varied, for example, once every second. Colorfulness and amusement can be expressed by varying the color approximately every 0.1 seconds.

The sectional arrangement of the liquid crystal display device 17 is explained with reference to FIG. 2.

Figure 2:
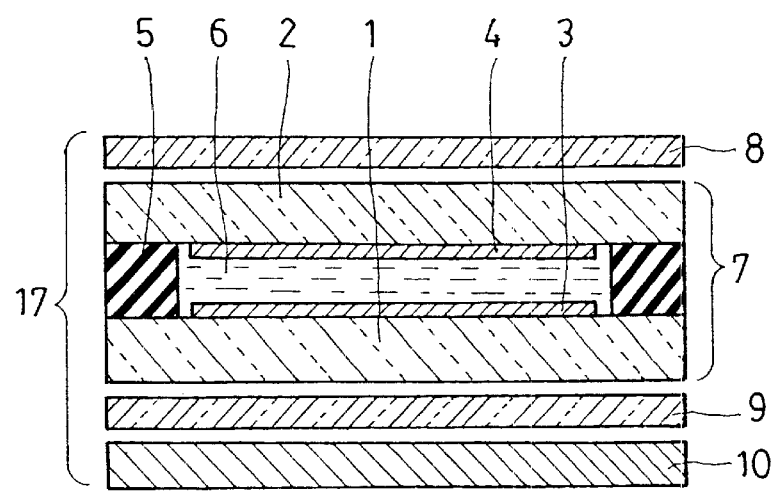
FIG. 2 is a sectional view showing an arrangement of the liquid crystal display device.

As shown in FIG. 2, the liquid crystal display device 17 in the embodiment is composed of a liquid crystal cell 7; a first polarizing film 9 and a second polarizing film 8 which are laid under and on the liquid crystal cell 7 respectively; and a reflector 10 provided outside the first polarizing film 9.

Regarding the liquid crystal cell 7, a first substrate 1, which is made of a glass plate with a thickness of 0.5 mm and on which transparent first electrodes 3 made of Indium Tin oxide (hereinafter "ITO") are mounted, is fixed by a sealing member 5 to a second substrate 2, which is made of a glass plate with a thickness of 0.5 mm and on which transparent second electrodes 4 made of ITO are mounted, the substrates 1 and 2 having a certain spaced interval between. In this space, nematic liquid crystal 6, which is aligned at a twist angle of 220°, is sandwiched and filled into the gap between the substrates 1 and 2. Resulting in the liquid crystal cell 7 in an STN mode.

The first polarizing film 9 and the reflector 10 are arranged outside the first substrate 1 of the liquid crystal cell 7 in the STN mode, and the second polarizing film 8 is arranged outside the second substrate 2 thereof, thus forming the birefringence color liquid crystal display device 17 of a reflection type.

Figure 3:
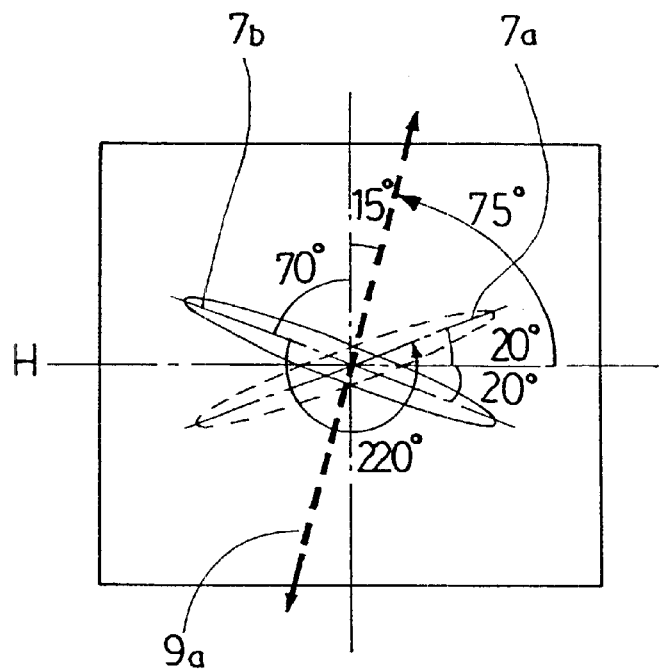
FIGS. 3 and 4 are plane views showing the positional relations between the liquid crystal cell and polarizing films in the liquid crystal display device.

On the surfaces of the first electrodes 3 and the second electrodes 4, alignment layers (not shown) are respectively formed. As shown in FIG. 3, the first substrate 1 undergoes a rubbing treatment upward to the right at a 20° angle with respect to a horizontal axis H, whereby a lower molecular alignment direction 7a of liquid crystal is disposed upward to the right (counterclockwise) at a 20° angle. The second substrate 2 undergoes a rubbing treatment downward to the right at a 20° angle, whereby an upper molecular alignment direction 7b is disposed downward to the right (clockwise) at a 20° angle. A so-called "chiral" substance, which is an optical rotatory material, is added to the nematic liquid crystal. The nematic liquid crystal has a viscosity of 20 cp. The chiral substance is added such that the twisting pitch P is adjusted to 14 $\mu$m, thus forming the STN mode liquid crystal cell 7 twisted counterclockwise to a 220° angle.

A difference $\Delta n$ in birefringence of the nematic liquid crystal 6 is set to be 0.21 and a cell gap d which is a gap between the first substrate 1 and the second substrate 2 is set to be 7 $\mu$m. Accordingly, a $\Delta nd$ value of the liquid crystal cell 7 which is represented by the product of the difference $\Delta n$ in the birefringence of the nematic liquid crystal 6 and the cell gap d, is 1470 nm.

Figure 4:
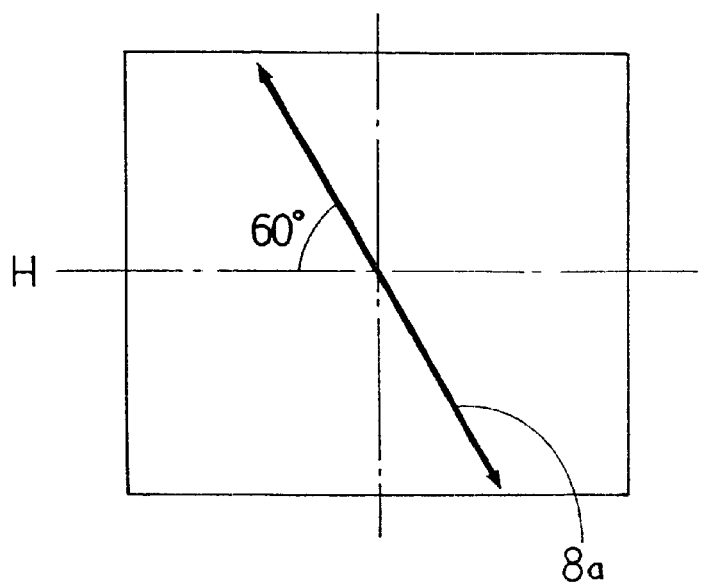

As shown in FIG. 4, an absorption axis 8a of the second polarizing film 8 is directed downward right at a 60° angle with respect to the horizontal axis H. An absorption axis 9a of the first polarizing film 9, as shown in FIG. 3, is directed upward right at a 75° angle with respect to the horizontal axis H. Consequently, the pair of upper and lower polarizing films 8 and 9 forms an intersecting angle of 45 degrees.

In the aforementioned liquid crystal display device 17 where no voltage is applied, a light linearly polarized in the direction vertical to the absorption axis 8a of the second polarizing film 8, is incident at an 50° angle with respect to the upper molecular alignment direction 7b of the liquid crystal cell 7, so as to assume an elliptic polarized state. By the elliptic polarized state and the optimization of the arrangement angle of the polarizing films 8 and 9, the light that has passed through the first polarizing film 9 changes to a bright pink color. This colored light is reflected by the reflector 10, and returns to pass through the first polarizing film 9, the liquid crystal cell 7 and the second polarizing 8, and then emitted to the visible side to create a pink display.

On the other hand, when a voltage is applied across the first electrodes 3 and the second electrodes 4, molecules of the nematic liquid crystal 6 rise, and the apparent $\Delta nd$ value of liquid crystal cell 7 is reduced. Hence, the elliptic polarized state generated in the liquid crystal cell 7 is changed, to vary colors.

Figure 5:
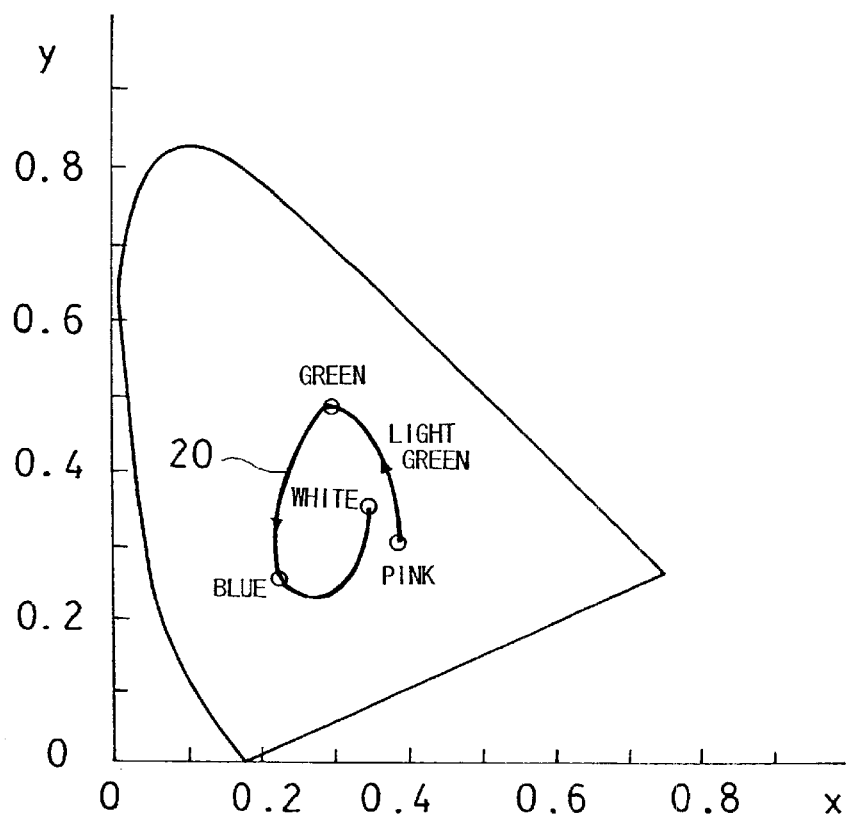
FIG. 5 is a chromaticity diagram showing display colors of the liquid crystal display device.

FIG. 5 is a chromaticity diagram showing a color display of the liquid crystal display device. A thick curved 20 with arrows indicates a change in color during a gradual increase in voltage applied across the first electrodes 3 and the second electrodes 4 in the liquid crystal cell 7, shown in FIG. 2, from a no-voltage state.

The initial color on the display is pink when no voltage is applied, but as the voltage is gradually increased, the color changes to light green, green and blue, and finally to white when applying a high voltage.

Figure 6:
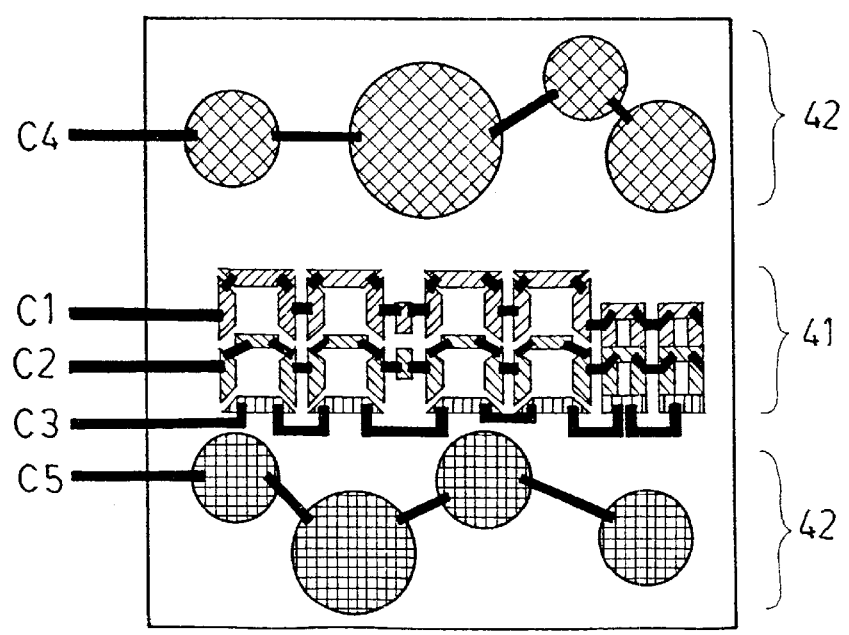
FIG. 6 is a plane view showing a configuration of first electrodes on a first substrate of the liquid crystal display device.
Figure 7:
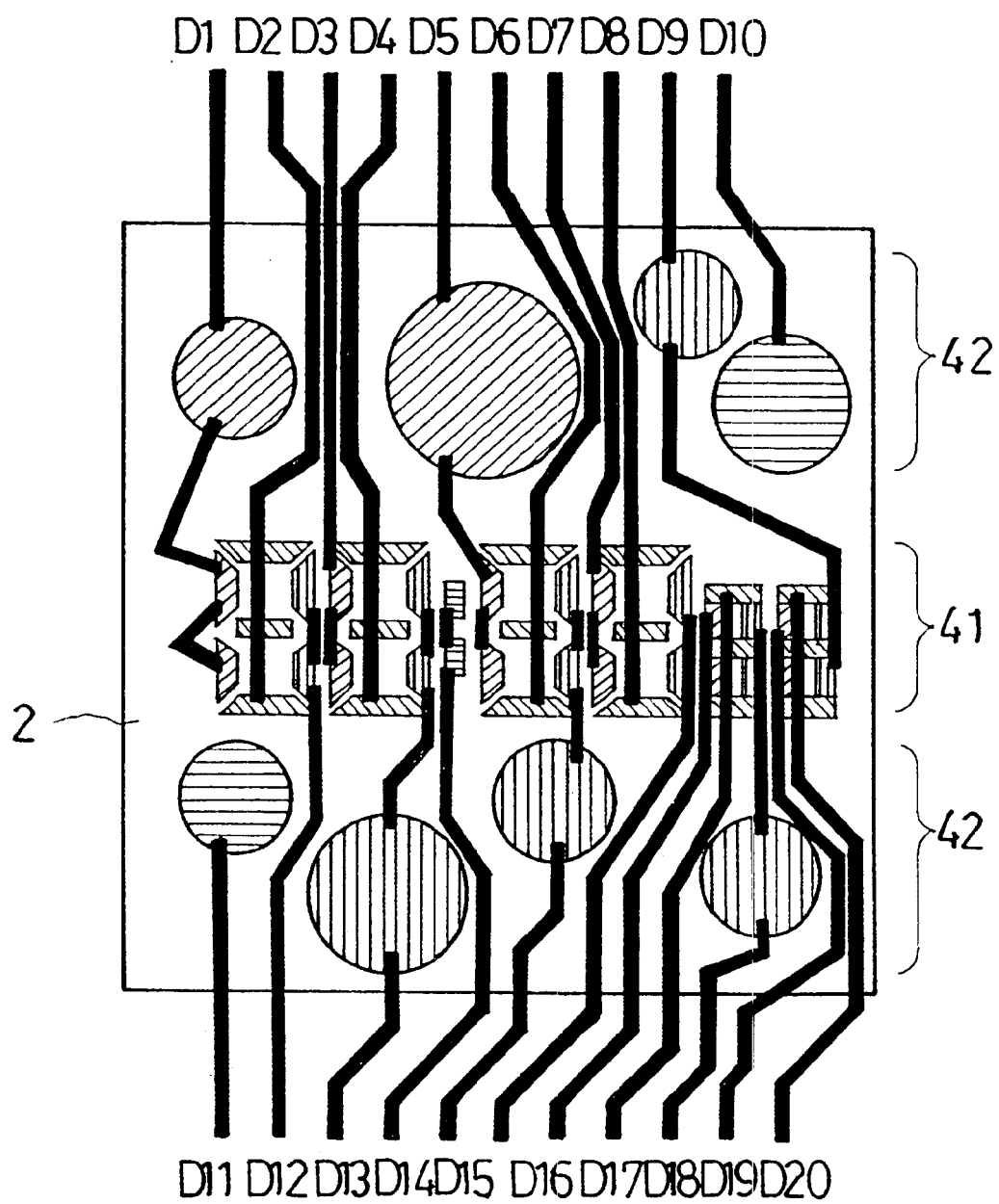
FIG. 7 is a plane view showing a configuration of second electrodes on a second substrate of the liquid crystal display device.

A configuration of electrodes in the liquid crystal cell 7 of the liquid crystal display device 17 will be now explained with references to FIG. 6 and FIG. 7.

FIG. 6 is a plane view from the top of the first electrodes 3, made of ITO and formed on the upper face of the first substrate 1. FIG. 7 is a plane view from the top of the second electrodes 4, made of ITO and formed on the lower face of the second substrate 2. In these drawings, electrode patterns are indicated and heavy lines indicate interconnection patterns thereof. Incidentally, reference numerals respectively correspond to the time display portion 41 and the mark display portions 42 shown in FIG. 1 are indicated.

As shown in FIG. 6, the first electrodes 3 consist of five scanning electrodes C1 to C5. The scanning electrodes C1 to C3 are connected to respective electrode patterns which form the letter display portion 41. The scanning electrode C4 and the scanning electrode C5 are connected to a plurality of circular electrodes which form the mark display portions 42 to display in multiple colors.

In the drawing, the scanning electrodes C1 to C5 are extended to the left side of the display screen for easy explanation. Practically, the scanning electrodes C1 to C5 are generally electrically connected to the second substrate 2 by a conductive paste or anisotropic conductive beads.

As shown in FIG. 7, the second electrodes 4 consist of twenty data electrodes D1 to D20. Interconnection for the data electrodes have several types such as: an interconnection to only the electrode pattern for the letter display portion 41, e.g. the data electrode D2; another interconnection to only the circular electrode for the mark display portion 42, e.g. the data electrode D10; and the other interconnection to both electrodes for the time display portion 41 and the mark display portion 42, e.g. the data electrode D1.

In the case of 1/3 duty multiplex drive, typically, the data electrode is connected to all three pixels. However, the mark display portion 42 has no bearing on an actual display, so that in the letter display portion 41, it is sufficient that the data electrode is connected to any number of the three pixels.

Figure 8:
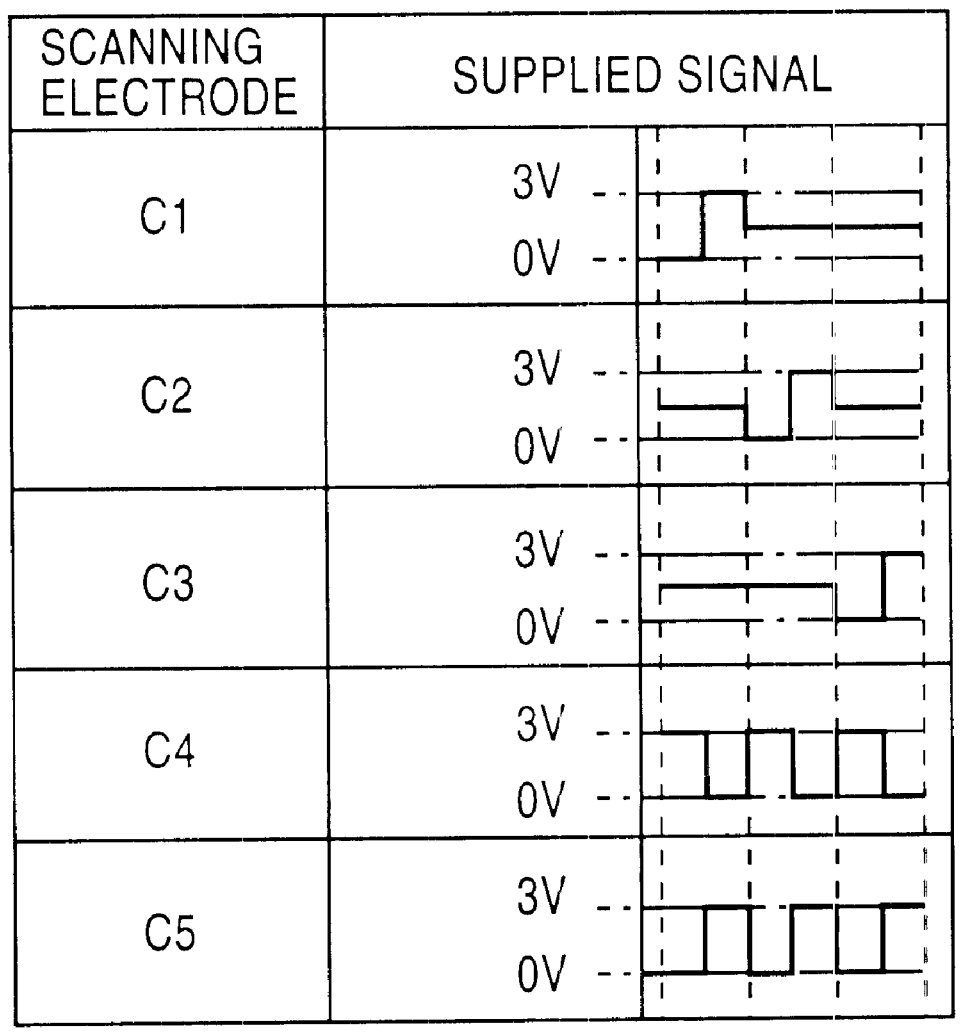
FIG. 8 is a waveform table of signals assigned to the respective scanning electrodes shown in FIG. 6.
Figures 9, 10:
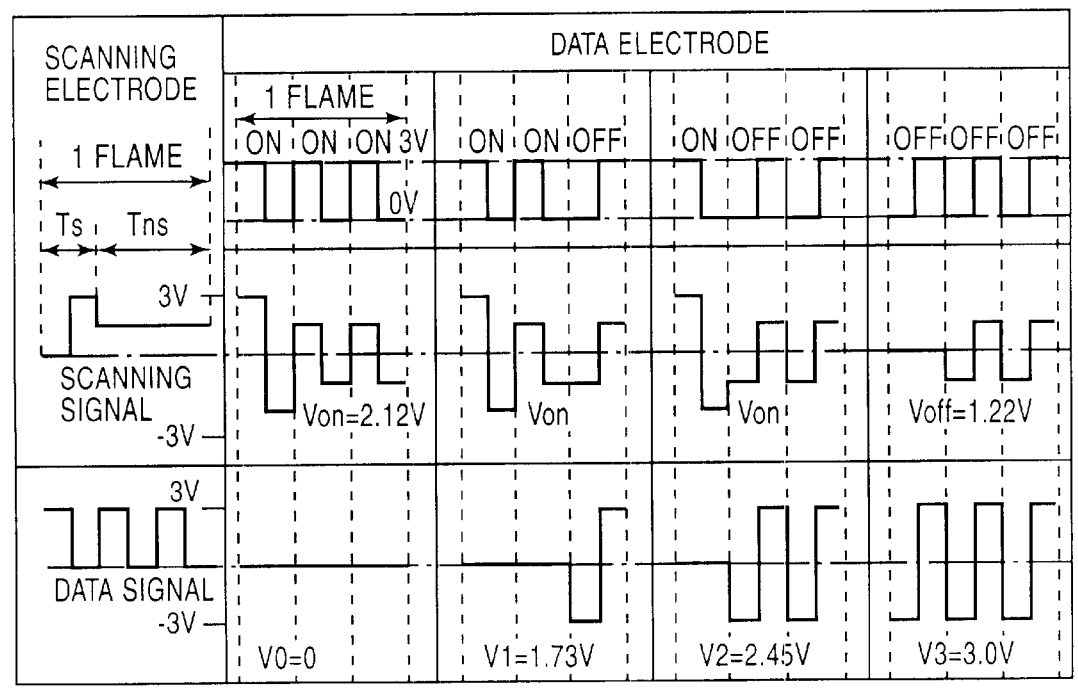
FIG. 9 is a waveform table showing signals assigned to the respective data electrodes D1, D5, D9 and D10 shown in FIG. 7, and combination waveforms with the signals supplied to the scanning electrode C4.
FIG. 10 is a waveform table showing the combination waveform and the signals supplied to the scanning electrodes and the data electrodes.

A method for driving the liquid crystal display device will be explained below with references to the driving signals shown in FIG. 8, FIG. 9 and FIG. 10. FIG. 8 shows signals supplied to the scanning electrodes C1 to C5 shown in FIG. 6. FIG. 9 shows signals supplied to the data electrodes D1, D5, D9 and D10 among the data electrodes shown in FIG. 7, and combination waveforms supplied to the liquid crystal between the scanning electrode C4 for the mark display portion 42 and the data electrodes. FIG. 10 shows signals supplied to the scanning electrodes and the data electrodes in the liquid crystal display device, and examples of the combination waveforms actually supplied to the liquid crystal in the case of the 1/3 duty multiplex drive, a half bias and a drive voltage of 3V.

To the scanning electrodes C1 to C3 for the letter display portion 41, the normal scanning signals as shown in FIG. 8 are supplied. To the scanning electrodes C4 and C5 for the mark display portion 42, the data signals are supplied. Now, a data signal of ON/ON/ON is supplied to the scanning electrode C4, and a data signal of OFF/OFF/OFF is supplied to the scanning electrode C5.

Hence, as shown in FIG. 9, to the pixel connected to the scanning electrode C4, a voltage is applied in four strengths of voltage, V3=3.0V, V2=2.45V, V1=1.73V and V0=0V, as combination waveforms due to the data signals assigned to the data electrodes D1, D5, D9 and D10. The voltage has an effective value, in which V3 becomes the square root of $(3^2+3^2+3^2)/3$ is 3, V2 becomes the square root of $(3^2+3^2+0^2)/3$ is 2.45, and V1 becomes the square root of $(3^2+0^2+0^2)/3$ is 1.73. Other voltages shown below are also effective values.

As shown in the top boxes in FIG. 9, an OFF/OFF/OFF data signal is supplied to the data electrode D1. Hence, the pixel (segment) of the letter display portion 41 connected to the data electrode D1 has Voff=1.22V, so that the display color is the same pink as the background color. The combination waveform with the signal for the scanning electrode C4 has V3=3V, so that the circular pattern 43 in the mark display portion 42 shown in FIG. 1 displays a white color (the color displayed with the maximum applied voltage as shown in FIG. 5).

As shown in the second box in FIG. 9, an OFF/OFF/ON data signal is supplied to the data electrode D5. Hence, the pixel of the letter display portion 41 connected to the data electrode D5 has Voff=1.22V, so that the display color is pink same as the background color. The combination waveform with the signal for the scanning electrode C4 has V2=2.45V, so that the color of the circular pattern 44 in the mark display portion 42 shown in FIG. 1 is blue (the color displayed when the applied voltage is slightly lower than the maximum thereof in FIG. 5).

In the third box in FIG. 9, an OFF/ON/ON data signal is supplied to the data electrode D9. Hence, the pixel of the letter display 41 connected to the data electrode D9 has Voff=1.22V and Von=2.12V, so that the respective display colors are pink and green which are the same as the background color. The combination waveform with the signal for the scanning electrode C4 has V1=1.73V, so that the display color of the circular pattern 45 in the mark display portion 42 shown in FIG. 1 is light green (the color displayed when the applied voltage is slightly higher than the minimum thereof in FIG. 5)

In the bottom box in FIG. 9, an ON/ON/ON data signal is supplied to the data electrode D10. The pixel of the letter display portion 41 is not connected to the data electrode 10, so that the display colors in the time display portion 41 are insensitive to the applied voltage on the data electrode D10. The combination waveform with the signal for the scanning electrode C4 has V0=0V, so that the display color of the pixel 46 in the mark display portion 42 shown in FIG. 1 is the same pink as the background color (the color displayed when the applied voltage is minimum in FIG. 5).

FIG. 10 shows a relation between the signal waveform supplied to the scanning electrode and the data electrode, and the combination waveform actually supplied to liquid crystal molecules.

A scanning signal used for a typical multiplex drive is supplied to the scanning electrode for the time display portion 41. Examples of the waveform in the case of a 1/3 duty multiplex drive, a half bias and a drive voltage of 3V, are shown in the drawing.

A scanning signal is composed of a select period Ts for applying voltages of 0V and 3V, and an unselect period Tns for applying a voltage of 1.5V, with one frame being formed by the select period Ts and the unselect period Tns. When an ON signal is sent from the data electrode to the select period Ts, ignoring an ON signal or an OFF signal of the data signal assigned to the unselect period Tns, the combination waveform assumes a fixed effective value Von. On the other hand, when an OFF signal is sent from the data electrode to the select period Ts, ignoring the data signal assigned to the unselect period Tns, the combination waveform assumes an effective value Voff, thus achieving a desired letter display.

Meanwhile, to the scanning electrodes C4 and C5 for the mark display portion 42 shown in FIG. 1, the same data signal as that fundamentally received by the data electrode is supplied. Examples when an ON/ON/ON data signal is supplied to the scanning electrode are shown in the bottom box in FIG. 10. When a data signal is supplied to the scanning electrode, the combination waveform in the 1/3 duty multiplex drive assumes four types of effective value due to the data signal supplied to the data electrode.

When a data signal supplied to the data electrode is ON/ON/ON, the data signal and a data signal supplied to the scanning electrode are negated mutually, so that a voltage applied to the liquid crystal becomes V0=0V. When a data signal supplied to the data electrode is ON/ON/OFF, two-thirds of the periods in a frame carry a voltage of 0V, and one-third of the periods in a frame carry a voltage of 3V, so that the combination waveform assumes an effective value of V1=1.73V. When a data signal supplied to the data electrode is ON/OFF/ON or OFF/ON/ON, an effective value is identical to the effective value of V1.

Similarly, when a data signal supplied to the data electrode is ON/OFF/OFF, one-third of the periods in a frame carry a voltage of 0V and two-thirds of the periods carry a voltage of 3V, so that the combination waveform assumes an effective value of V2=2.45V. When a data signal supplied to the data electrode is OFF/OFF/ON or OFF/ON/OFF, an effective value is identical to the effective value of V2.

When a data signal supplied to the data electrode is OFF/OFF/OFF, the combination waveform assumes an effective value of V3=3V.

As described hereinbefore, a value of a voltage applied to the liquid crystal is permitted to vary in value to V0, V1, V2 and V3. Consequently, in the watch which installs the birefringence color liquid crystal display device capable of varying colors with a change in the applied voltage, the display color of the mark display portion 42 can be changed by supplying the data signal to the scanning electrode for the mark display portion 42 even when a typical monochrome liquid crystal driving IC without a gray scale function is employed therein.

In other words, the embodiment allows the time display portion 41 to display green letters on a pink background, and the circular patterns 43, 44, 45 and 46 as each pixel in the mark display portion 42 to display in multiple colors such as white/blue/light green/pink. Since a monochrome liquid crystal driving IC has a simple circuit, a small size and low power consumption compared with those of a color liquid crystal driving IC, the use of monochrome liquid crystal driving IC is preferable, giving longer battery life in a timepiece or portable machines.

The data signals, supplied to the data electrodes, are changed at intervals of from approximately 0.1 seconds to one second, whereby the display color of each circular pattern in the mark display portion 42 in turn is changed at intervals of 0.1 seconds to one second, thus allowing a colorful and impressive display screen, resulting in the provision of novel portable machines for young people.

Modification of the First Embodiment

The liquid crystal display device used in the watch of the first embodiment employs the STN mode liquid crystal cell 7, having a Δnd value=1470 nm at a twist angle of 220°, as a liquid crystal cell. However, a color display similar to that of the first embodiment can be obtained insofar as a Δnd value ranges from 1300 nm to 1600 nm.

When a Δnd value of the liquid crystal cell 7 is smaller than 1300 nm, the amount of the change in an apparent Δnd value through the application of a voltage decreases, thus colors of blue and white are not easily displayed. On the other hand, when the Δnd value exceeds 1600 nm, a pink color on the background is not easily displayed. Consequently, any Δnd value of less than 1300 nm and more than 1600 nm is undesirable.

In either using a TN mode liquid crystal cell or an STN mode liquid crystal cell having a twist angle of more than 180°, the birefringence color liquid crystal display device similar to that described in the embodiment, but differing in the color tone therefrom, can be obtained, hence providing a colorful watch.

The liquid crystal display device for a watch is described in the embodiment but, as a matter of course, the present invention is adaptable to liquid crystal display devices for a portable tape recorder, a cellular phone or the like.

The first embodiment describes the first electrodes 3 as the scanning electrodes and the second electrodes 4 as the data electrodes, but reversibly, the second electrodes 4 may operate as the scanning electrodes and the first electrodes 3 may operate as the data electrodes. In this case, the scanning signals are assigned to the second electrodes 4 for the time display portion 41 and the data signals are assigned to the second electrodes 4 for the mark display portions 42.

Second Embodiment: FIGS. 11 to 19

A second embodiment according to the present invention will be described with references to FIGS. 11 to 19.

A color liquid crystal display device in the second embodiment differs from that of the first embodiment in the points of: the provision of a retardation film and a pattern of an electrode; a driving signal for the liquid crystal display device; and the provision of a backlight unit. The remaining structure of the liquid crystal display device in the second embodiment is the same as that in the first embodiment.

Figure 11:
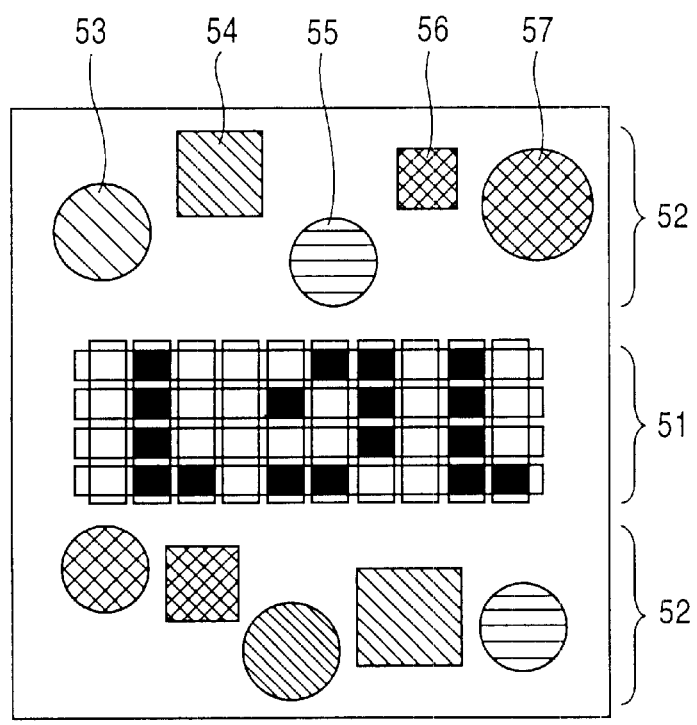
FIG. 11 is a plane view showing a display portion of a liquid crystal display device of a second embodiment according to the present invention.

As shown in FIG. 11, the display portion of the liquid crystal display device 18 is made up of a letter display portion 51 in a dot matrix display for displaying current time and alarm time, and mark display portions 52 which are respectively formed above and under the time display portion 41 and display a variety of colors. Each mark display portions 52 consist of a plurality of circular patterns 53, 55 and 57 and square patterns 54 and 56. The time display portion 51 does not change color, and always displays time in a predetermined color.

The mark display portions 52 display in different colors on the respective patterns 53 to 57, and the color is varied once every second. The color is varied approximately every 0.1 seconds, thus achieving colorful and impressive portable machines, a watch or the like.

Figure 12:
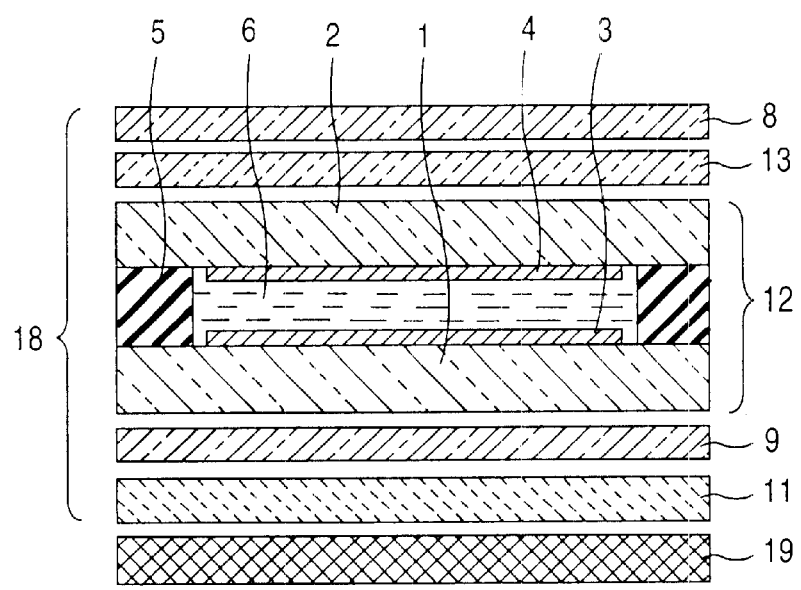
FIG. 12 is a sectional view showing an arrangement of the liquid crystal display device.

FIG. 12 shows the sectional arrangement of the liquid crystal display device, in which the same reference numerals will be used to designate components corresponding to those in the liquid crystal display device of the first embodiment shown in FIG. 2 and the description thereof will be omitted.

In a liquid crystal cell 12 of the liquid crystal display device 18, a nematic liquid crystal 6, which is aligned at a twist angle of 240°, is sandwiched and filled into a gap between the first substrate 1 and the second substrate 2, to form an STN mode liquid crystal cell.

Outside the second substrate 2 of the liquid crystal cell 12, the second polarizing film 8 is arranged to sandwich the retardation film 13 with a retardation value of 1800 nm therebetween. Outside the first substrate 1, the first polarizing film 9, a transflective reflector 11 and a backlight unit are arranged. Because transflective reflector 11 partly transmits a light from underneath, the backlight unit 19 can illuminate the liquid crystal cell 12 through the transflective reflector 11 by being positioned under the transflective reflector 11. Therefore, a transflective type birefringence color liquid crystal display device 18 can be formed.

Alignment layers (not shown) are respectively formed on the surfaces of the first electrodes 3 and the second electrodes 4 of the liquid crystal cell 12. The first substrate 1 undergoes a rubbing treatment upward to the right at a 30° angle with respect to a horizontal axis H shown in FIG. 13, whereby a lower molecular alignment direction 12a of liquid crystal is disposed upward to the right at a 30° angle. The second substrate 2 undergoes a rubbing treatment downward to the right at a 30° angle, whereby an upper molecular alignment direction 12b of liquid crystal is disposed downward to the right at a 30° angle. The nematic liquid crystal has a viscosity of 20 cp. A so-called "chiral" substance, which is an optical rotatory material, is added to the nematic liquid crystal. The chiral substance is added such that the twisting pitch P is adjusted to 16 μm, thus forming the STN mode liquid crystal cell 12 twisted counterclockwise at 240° angle.

A difference Δn in birefringence of the nematic liquid crystal 6 used is set to be 0.21 and a cell gap d which is a gap between the first substrate 1 and the second substrate 2 is set to be 8 μm. Accordingly, a Δnd value of the liquid crystal cell 12 which is represented by the product of the difference Δn in the birefringence of the nematic liquid crystal 6 and the cell gap d, is 1680 nm. The retardation value for the retardation film 13 is set to be a value 120 nm larger than the Δnd value of the liquid crystal cell 12.

A uniaxial stretching film made of a polycarbonate film is used for the retardation film 13. Accordingly, the equation nx>ny=nz is obtained, where nx is a refractive index of a phase delay axis 13a of the retardation film, ny is a refractive index in a y-axis direction orthogonal to the phase delay axis 13a, and nz is a refractive index in a z-axis direction as a thickness direction.

Figure 13:
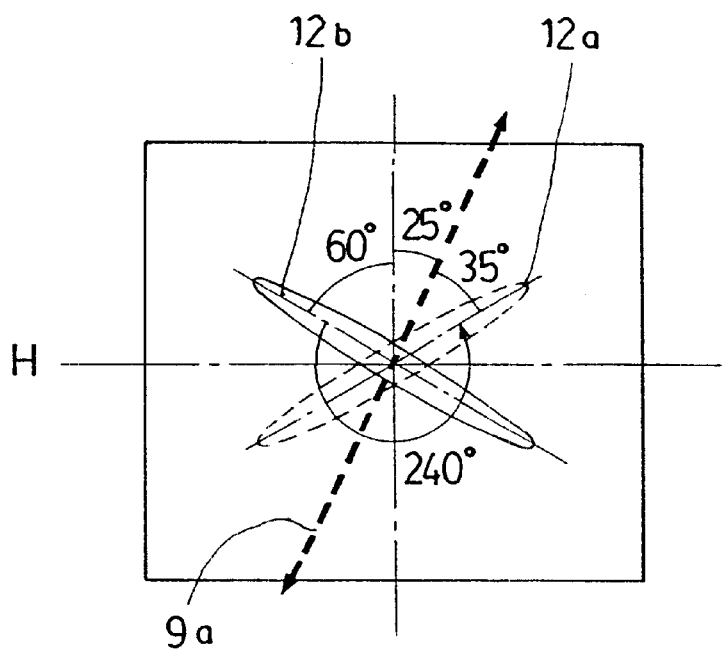
FIGS. 13 and 14 are plane views showing the positional relations between the liquid crystal cell and polarizing films in the liquid crystal display device.
Figure 14:
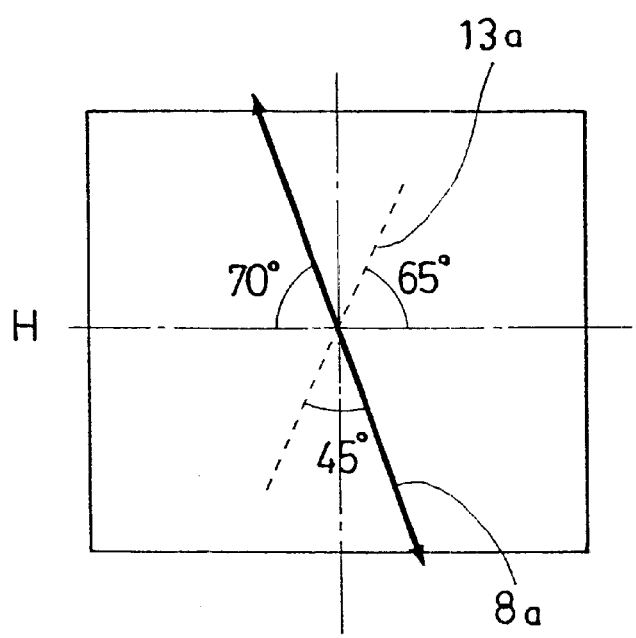

As shown in FIG. 14, the retardation film 13 is arranged to dispose its phase delay axis 13a upward to the right at a 65° angle with respect to the horizontal axis H. The absorption axis 8a of the second polarizing film 8 is disposed counterclockwise at a 45° angle with respect to the phase delay axis 13a of the retardation film 13. As shown in FIG. 13, the absorption axis 9a of the first polarizing film 9 is disposed counterclockwise at a 35° angle with respect to the lower molecular alignment direction 12a of the liquid crystal cell 12. The pair of upper and lower polarizing films 8 and 9 form an intersecting angle of 45°.

As for the aforementioned birefringence color liquid crystal display device 18, in a no-voltage state, a linearly polarized light incident from the second polarizing film 8 assumes an elliptic polarized state by the birefringence effect of the retardation film 13. Thereafter, the elliptic polarized light returns to a linearly polarized light when passing through the liquid crystal cell 12 due to a difference between the retardation value of the retardation film 13 and the Δnd value of the liquid crystal cell 12, and the optimized arrangement-angle of the polarizing films. In this time, when the positional relation between the absorption axis 9a of the first polarizing film 9 and the absorption axis 8a of the second polarizing film 8 forms an intersecting angle of 45° as described in the embodiment, the linearly polarized light does not pass through the first polarizing film 9, so that the display color becomes black.

On the other hand, when a voltage is applied across the first electrodes 3 and the second electrodes 4 of the liquid crystal cell 12, molecules of the nematic liquid crystal 6 rise, and the apparent Δnd value of liquid crystal cell 12 is reduced. For this reason, the elliptic polarized light generated in the retardation film 13 does not return to a complete linearly polarized light even after passing through the liquid crystal cell 12. Consequently, the light in the elliptic polarized state reaches the first polarizing film 9, and a light having a certain wavelength passes through the first polarizing film 9, resulting in a colored light. The colored light after being passed through the first polarizing film 9 is reflected by the transflective reflector 11, and it returns to pass through the first polarizing film 9, the liquid crystal cell 12, the retardation film 13 and the second polarizing film 8 in order, and then it is emitted towards the visible side to display in color.

Figure 15:
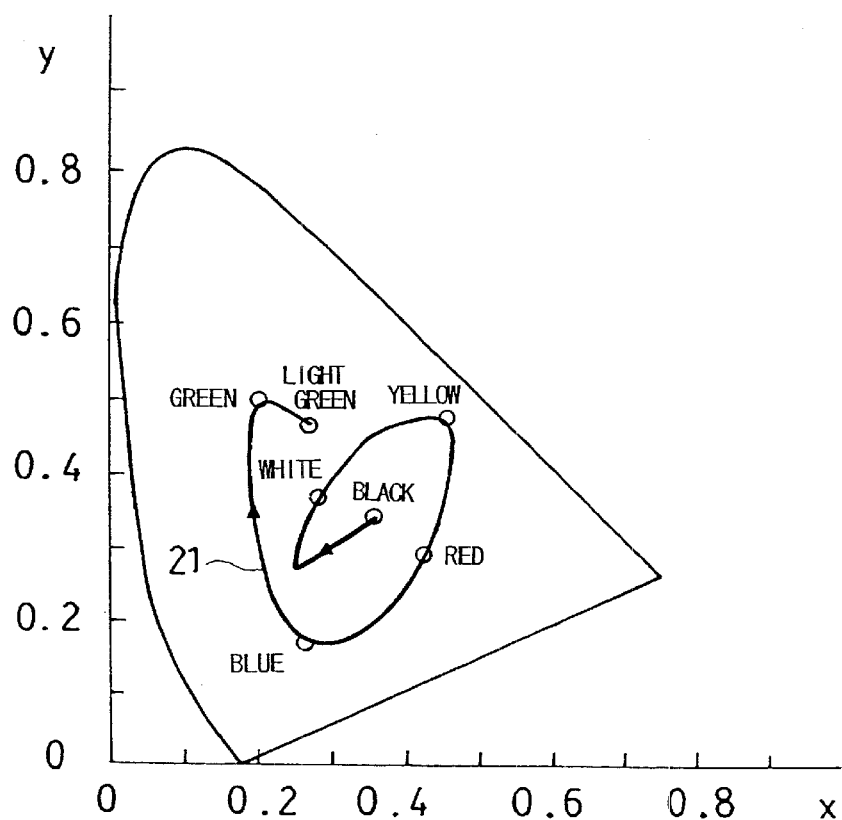
FIG. 15 is a chromaticity diagram showing display colors of the liquid crystal display device.

FIG. 15 is a chromaticity diagram showing a color display of the birefringence color liquid crystal display device 18. A thick curved line 21 with arrows indicates a change in color with a gradual increase of the applied voltage from a state of no applied voltage. In a no-voltage state, the display color is approximately black. While a voltage is applied gradually to increase, after the display color changes to white once, it then changes to yellow, red, blue, green, and finally to light green when the voltage is further applied.

Figure 16:
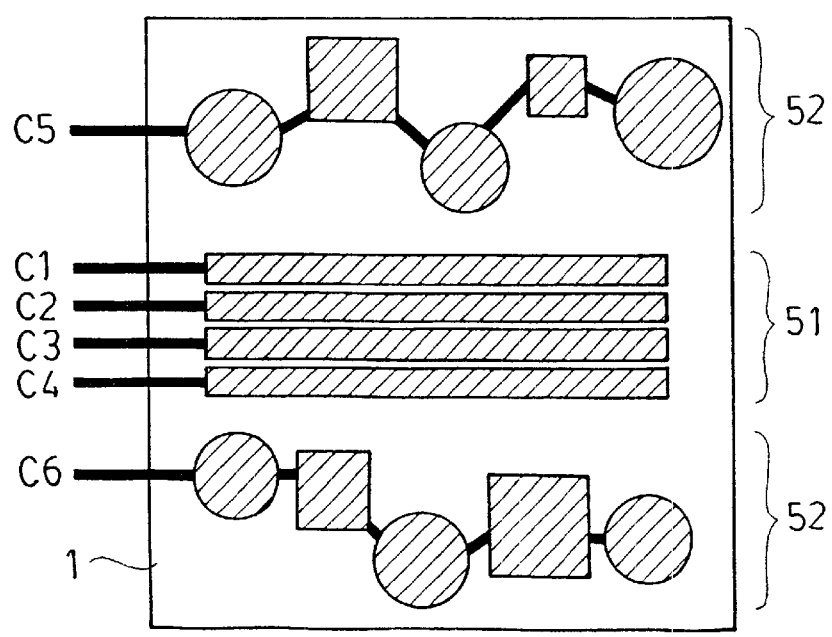
FIG. 16 is a plane view showing a configuration of first electrodes on a first substrate of the liquid crystal display device.
Figure 17:
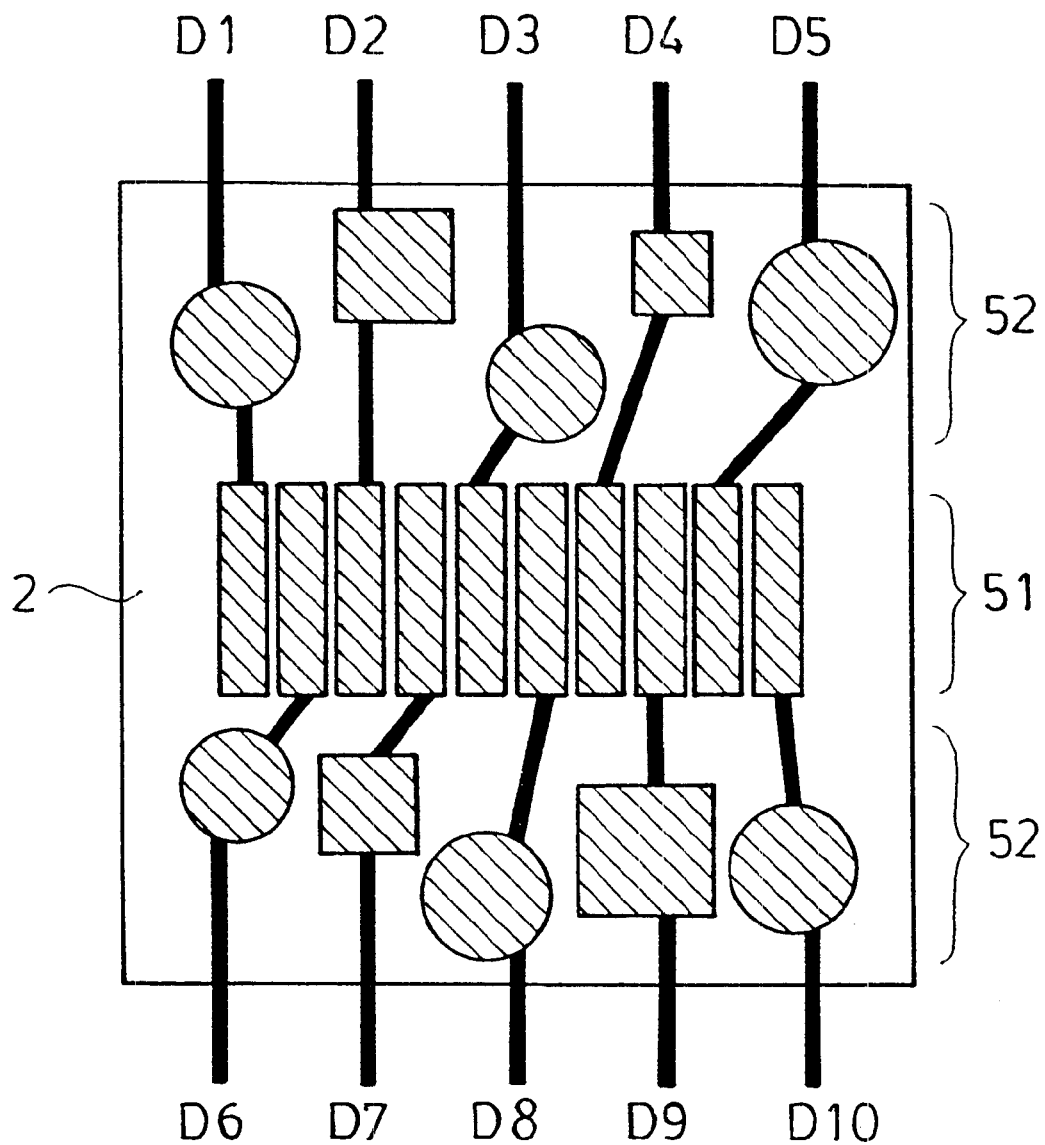
FIG. 17 is a plane view showing a configuration of second electrodes on a second substrate of the liquid crystal display device.

A configuration of electrodes in the liquid crystal display device 18 of 10 the second embodiment will be now explained with references to FIG. 16 and FIG. 17. FIG. 16 is a plane view from the top of the first electrodes 3, made of ITO and mounted on the upper face of the first substrate 1 of the liquid crystal cell 12. FIG. 17 is a plane view from the top of the second electrodes 4, made of ITO and mounted on the lower face of the second substrate 2.

As shown in FIG. 16, the first electrodes 3 of the liquid crystal cell 12 in the liquid crystal display device 18 consist of six scanning electrodes C1 to C6. The scanning electrodes C1 to C4 are respectively connected to four transverse bar-shaped electrodes which form a matrix in the time display portion 51. The scanning electrode C5 and the scanning electrode C6 are connected, in series, to a plurality of circular and square electrodes which constitute two pair of mark display portions 52 and display in multiple colors.

In the drawing, the scanning electrodes C1 to C6 are extended to the left side of the display screen for easy explanation. Practically, the scanning electrodes C1 to C6 are generally connected with the second substrate 2 by a conductive paste or anisotropic conductive beads.

As shown in FIG. 17, the second electrodes 4 of the liquid crystal cell 12 consist of ten data electrodes D1 to D10. Each of the data electrodes D1 to D10 is connected to both the vertical bar-shaped electrode, forming a matrix in the letter display portion 51, and the circular or square electrode, forming the mark display portions 52, of which the capacities of interconnections are approximately the same to improve evenness of display.

A method for driving the liquid crystal display device 18 will be described below with references to the driving signals shown in FIG. 18 and FIG. 19.

Figure 18:
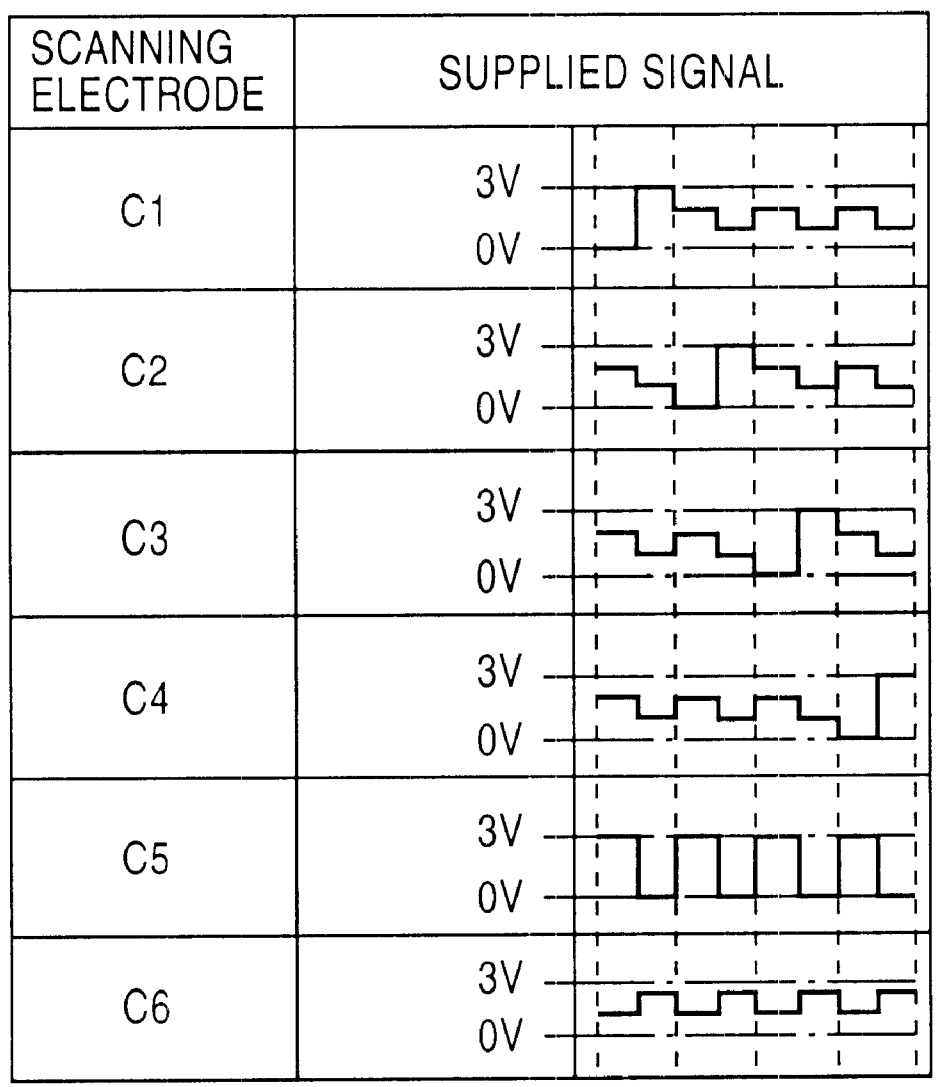
FIG. 18 is a waveform table of signals assigned to the respective scanning electrodes shown in FIG. 16.

FIG. 18 shows signals supplied to the scanning electrodes C1 to C6 shown in FIG. 16. FIG. 19 shows signals supplied to the data electrodes D1 to D5 of the data electrodes shown in FIG. 17, and combination waveforms supplied to the liquid crystal between the scanning electrode C5 for the mark display portion 52 and the data electrodes.

In the second embodiment, the drive of the liquid crystal display device 18 with the quadplex drive, a one-third bias and a drive voltage of 3V is explained. When a normal scanning signal is supplied to a scanning electrode, the combination waveform with a data signal supplied to a data electrode becomes Von=1.73V and Voff=1.0V as an effective value, so that the letter display portion 51 displays green letters on a black background. Other values of voltage described below are all effective values.

As shown in FIG. 18, normal scanning signals are supplied to the scanning electrodes C1 to C4 for the letter display portion 51, but data signals are supplied to the scanning electrodes C5 and C6 for the mark display portions 52. Here, the data signal of ONION/ONION is assigned to the scanning electrode C5, and the data signal of OFF/OFF/OFF/OFF is assigned to the scanning electrode C6.

Accordingly, as shown in FIG. 19, five strengths of voltage, V4=2.0V, V3=1.73V, V2=1.41V, V1=1.0V and V0=0V, are applied as the combination waveform, due to the data signals received by the data electrodes D1 to D5, to pixels connected to the scanning electrode C5.

As shown in the top boxes in FIG. 19, an OFF/OFF/OFF/OFF data signal is supplied to the data electrode D1. Hence, the pixel of the letter display portion 51 connected to the data electrode D1 has Voff=1.0V, so that the pixel displays in a black color which is the same as that of the background color. However, the combination waveform with the signal for the scanning electrode C5 has V4=2.0V, so that the circular pattern (pixel) 53 in the mark display portion 52 shown in FIG. 11 displays a light green color.

As shown in the second box in FIG. 19, an OFF/OFF/OFF/ON data signal is supplied to the data electrode D2. Hence, the combination waveform with the signal for the scanning electrode C5 has V3=1.73V, so that the square pattern 54 in the mark display portion 52 shown in FIG. 11 displays a green color.

In the third box in FIG. 19, an OFF/ON/OFF/ON data signal is supplied to the data electrode D3. Hence, the combination waveform with the signal for the scanning electrode C5 has V2=1.41V, so that the display color of the circular pattern 55 in the mark display portion 52, shown in FIG. 11, is blue.

In the fourth box in FIG. 19, an ON/ON/ON/OFF data signal is supplied to the data electrode D4. Hence, the combination waveform with the signal for the scanning electrode CS has V1=1V, so that the display color of the square pattern 56 in the mark display portion 52, shown in FIG. 11, is black which is the same as that of the background color.

In the bottom box in FIG. 19, an ON/ON/ON/ON data signal is supplied to the data electrode D5. Hence, the combination waveform with the signal for the scanning electrode C5 has V0=0V, so that the display color of the circular pattern 57 in the mark display portion 52, shown in FIG. 11, is black, similar to the square pattern 56, which is the same as that of the background color.

As described hereinbefore, the birefringence color liquid crystal display device 18 is driven using the typical monochrome liquid crystal driving IC without a gray scale function, whereby the letter display portion 51 is allowed to display green letters on a black background, and each pattern (pixel) in the mark display portions 52 is allowed to display in multiple colors such as black/blue/green/light green. Since the monochrome liquid crystal driving IC has a simple circuit, a small size and low power consumption compared with those of a color liquid crystal driving IC, the use of monochrome liquid crystal driving IC is preferable due to longer battery life in portable machines, a timepiece or the like.

The data signals are changed at intervals of from approximately 0.1 seconds to one second and supplied to the data electrode, whereby the display color of each pattern in the mark display portions 52 in turn is changed at intervals of 0.1 seconds to one second, thus allowing a colorful and impressive display screen, resulting in the provision of novel portable machines for young people.

Modification of the Second Embodiment

In the liquid crystal display device of the second embodiment, the transflective reflector 11 is used as a reflector, and the backlight unit 19 is installed, thereby allowing visibility of the display even at night. However, a reflector may be used for only reflecting without employing the backlight unit 19.

The liquid crystal display device of the embodiment uses the STN mode liquid crystal cell 12 having a Δnd value= 1680 nm at a twist angle of 240°, and the retardation film 13 having a retardation value of 1800 nm. However, a display color similar to that in the second embodiment can be obtained insofar as a Δnd value of the STN mode liquid crystal cell 12 ranges from 1500 nm to 1800 nm, and the retardation film 13 has a retardation value from 50 nm to 200 nm larger than a Δnd value of the liquid crystal cell 12.

When a Δnd value of the liquid crystal cell 12 is smaller than 1500 nm, the amount of the change in an apparent Δnd value through the application of voltage decreases, thus colors of blue and green are not easily displayed. On the other hand, when the Δnd value exceeds 1800 nm, variations in color occurs abruptly, and the amount of color-variation due to inconsistencies and temperature unfavorably increases. Consequently, any Δnd value of less than 1500 nm and more than 1800 nm is undesirable.

Even in the use of any one of a TN mode liquid crystal cell, an STN mode liquid crystal cell having a twist angle of more than 180° and a combination of a retardation film and a STN mode liquid crystal cell having a twist angle of more than 180°, the birefringence color liquid crystal display device similar to that described in the embodiment, but differing in the color tone therefrom, can be designed, thus providing a colorful watch.

The liquid crystal display device of the embodiment uses a uniaxial stretching film made of a polycarbonate film as the retardation film 13. However, the viewing angle characteristic can be further improved by employing a biaxial retardation film having the relations of nx>nz>ny, where nx is the refractive index in the direction of a phase delay axis 13a of the retardation film, ny is the refractive index in the y-axis direction orthogonal to the phase delay axis 13a, and nz is the refractive index in the z-axis direction as the thickness direction.

An improved color display is allowed by employing, instead of the retardation film 13, a twisted retardation film which is coated and fixed with a liquid crystal polymer on a triacetyl cellulose (TAC) film or a polyester (PET) film.

As a result of utilizing the liquid crystal cell 12, with Δnd=1680 nm of the embodiment, and the twisted retardation film, with a Δnd value=1650 nm at a clockwise twist angle of 240°, in combination, a birefringence color liquid crystal display device capable of displaying information in bright colors on a black background is achieved, resulting in a watch with a further colorful display.

When the birefringence color liquid crystal display device is constructed of the STN mode liquid crystal cell 12 and the twisted retardation film, by using the STN mode liquid crystal cell 12 having a Δnd value ranging from 1500 nm to 1800 nm and the twisted retardation film having a Δnd value from 10 nm to 100 nm smaller than the Δnd value of the liquid crystal cell 12, colors similar to those of the embodiment are obtained.

In the birefringence color liquid crystal display device, installing the twisted retardation film, when a Δnd value of the liquid crystal cell 12 is smaller than 1500 nm, the amount of the change in an apparent Δnd value through the application of voltage decreases, thus colors of blue and green are not easily displayed. And the Δnd value that exceeds 1800 nm is undesirable, because variations in color occurs vigorously and abruptly, and the amount of color-variation due to inconsistencies and temperature increases.

The second embodiment describes the liquid crystal display device for a watch, but as a matter of course, the present invention is adaptable to a liquid crystal display device for a portable tape recorder, a cellular phone or the like.

The embodiment describes the first electrodes 3 as the scanning electrodes and the second electrodes 4 as the data electrodes, but reversibly, the second electrodes 4 may operate as the scanning electrodes and the first electrodes 3 may operate as the data electrodes. In this case, the scanning signals are assigned to the second electrodes 4 for the time display portion 51 and the data signals are assigned to the second electrodes 4 for the mark display portions 52.

In the embodiment, a simple shape, such as a circle and square, is used in the mark display portion of the liquid crystal display device, but it may be an elaborate graphic, a letter shape or a shape of an animal or vehicle etc.

The aforementioned embodiment describes about the 1/4 duty multiplex drive as the driving method for the liquid crystal display device. However, preferably, if the number of duty N further increases, an effective value of the combination waveform for the mark display portion takes N+1, so that an optimum voltage for the liquid crystal display device can be easily selected for the effective value.

The aforementioned embodiment explains the driving method for the liquid crystal display device taking, as an example, the in-a-line reverse driving for reversing positive and negative poles within a frame so as to avoid the application of direct current to the liquid crystal cell, but the liquid crystal display device may be driven by employing an n-line reverse driving for reversing positive and negative poles every n line, or a frame reverse driving for reversing positive and negative poles every frame.

Third Embodiment: FIGS. 20 to 23

A third embodiment according to the present invention will be described below with references to FIG. 20 to FIG. 23. The same reference numerals will be used to designate the same components as those described in the first and second embodiments and the description thereof will be omitted.

Figure 21:
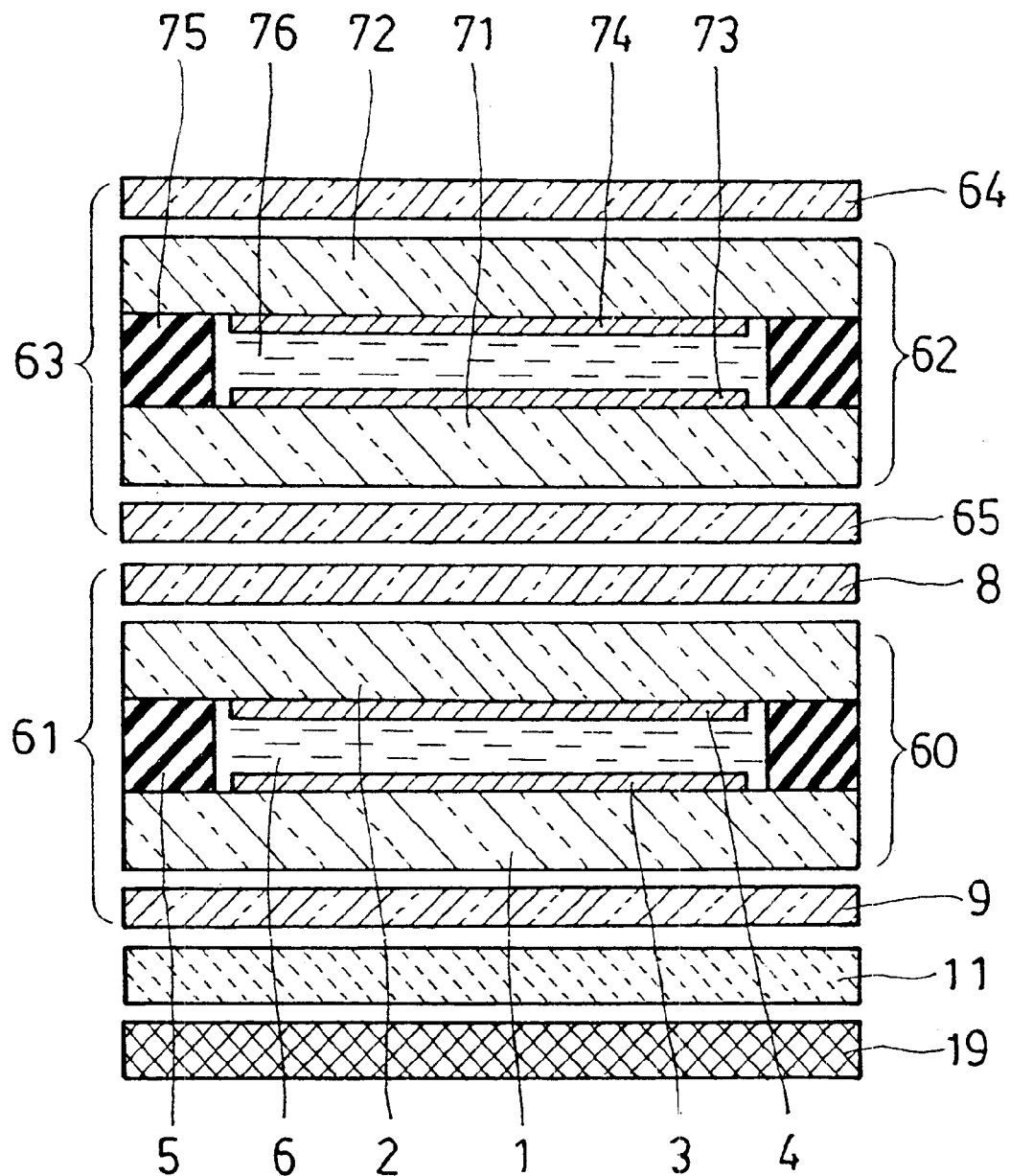
FIG. 21 is a sectional view showing an arrangement of the liquid crystal display device.

The liquid crystal display device of the third embodiment is a two-stage liquid crystal display device which includes a first liquid crystal display device 61 and a second liquid crystal display device 63, as shown in FIG. 21.

Figure 20:
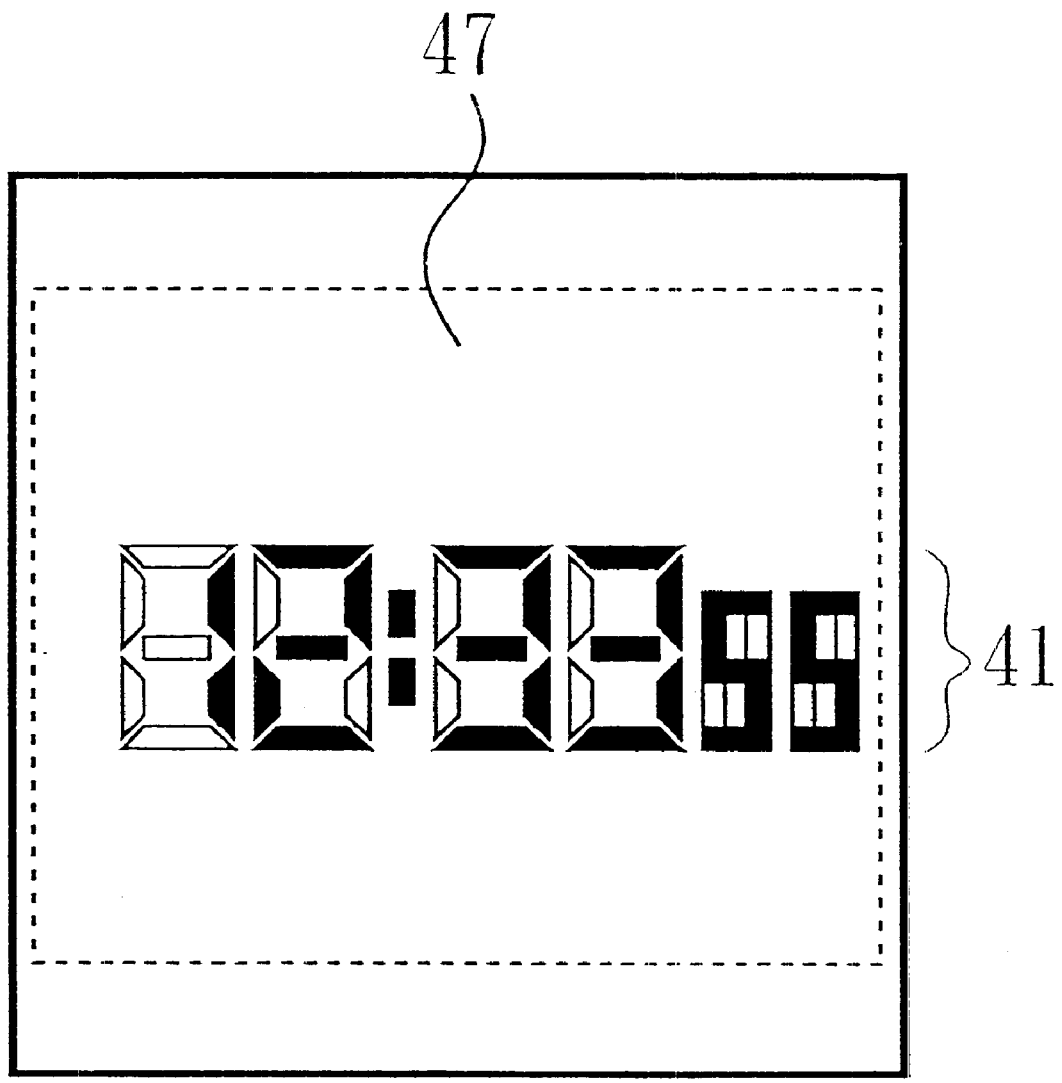
FIG. 20 is a plane view showing a display portion of a liquid crystal display device of a third embodiment according to the present invention.

As shown in FIG. 20, a display portion of the first liquid crystal display device 61 consists of the letter display portion 41 for displaying a current time, alarm time or the like. A display portion of the second liquid crystal display device 63 composes a rectangular shutter portion 47 as indicated with the broken line in FIG. 20.

Since the second liquid crystal display portion 63 lies upon the first liquid crystal display portion 61, a silver color is displayed to hide the letter display portion 41 while the shutter portion 47 is closed. When the shutter portion 47 is opened, the letter display portion 41 becomes visible.

While the shutter portion 47 is closed, the display assumes a mirror state completely, so that the watch or the portable machine looks like an accessory, resulting in the provision of fashionable and attractive watch or portable machines.

The configuration of the two-stage liquid crystal display device of the third embodiment will be explained with reference to FIG. 21 being a sectional view thereof, and FIG. 22 and FIG. 23 which are plane views each showing a positional relation between a liquid crystal cell and polarizing films.

In FIG. 21, the first liquid crystal display device 61 is composed of a TN mode first liquid crystal cell 60, comprising: the first substrate 1 which is made of a glass plate with a thickness of 0.5 mm and on which first electrodes 3, made of ITO, are mounted; the second substrate 2 which is made of a glass plate with a thickness of 0.5 mm and on which second electrodes 4, made of ITO, are mounted; the sealing member 5 for adhering between the first substrate 1 and the second substrate 2; and the nematic liquid crystal 6 which is aligned at a twist angle of 90°, and which is sandwiched and filled in a gap between the first substrate 1 and the second substrate 2.

The first polarizing film 9 and the transflective reflector 11 are arranged outside the first substrate 1 of the first liquid crystal cell 60. The second polarizing film 8 lies outside the second substrate 2.

Since the transflective reflector 11 partly transmits light from underneath, the backlight unit 19 is provided in the watch so as to design a translucent-type liquid crystal display device.

The second liquid crystal display device 63 is formed as a TN mode second liquid crystal cell 62 by: a first substrate 71 which is made of a glass plate with a thickness of 0.3 mm and on which a first electrode 73, made of ITO, is mounted; a second substrate 72 which is made of a glass plate with a thickness of 0.3 mm and on which a second electrode 74, made of ITO, is mounted; a sealing member 75 for adhering between the first substrate 71 and the second substrate 72; and a nematic liquid crystal 76 which is aligned at a twist angle of 90°, and which is sandwiched and filled in a gap between the first substrate 71 and the second substrate 72.

Outside the first substrate 71 of the second liquid crystal cell 62, a reflection-type polarizing film 65 is laid. Outside the second substrate 72, a third polarizing film 64 is laid. The reflection-type polarizing film 65 is a film which is formed by laminating more than 100 layers each formed with a materials dissimilar in refractive index, and which has the properties of transmitting a linearly polarized light in the direction parallel to the transmission axis, but reflecting a linearly polarized light in the direction orthogonal to the transmission axis. In the embodiment, D-BEF-A (trade name) made by 3M Co., Ltd. is used for the film.

On the surfaces of the first electrodes 3 and the second electrodes 4 of the first liquid crystal cell 60, alignment layers (not shown) are formed respectively. As shown in FIG. 22, the first substrate 1 undergoes a rubbing treatment downward to the right at a 45° angle with respect to the horizontal axis H, whereby a lower molecular alignment direction 60a of liquid crystal is disposed downward to the right at a 45° angle. The second substrate 2 undergoes a rubbing treatment upward to the right at a 45° angle, whereby an upper molecular alignment direction 60b of liquid crystal is disposed upward in the right at a 45° angle. The nematic liquid crystal has a viscosity of 20 cp. A so-called "chiral" substance, which is an optical rotatory material, is added to the nematic liquid crystal. The chiral substance is added such that the twisting pitch P is adjusted to approximately 100 $\mu$m, thus forming the TN mode first liquid crystal cell 60 twisted counterclockwise at a 90° angle.

A difference $\Delta$n in birefringence of the nematic liquid crystal 6 used in the first liquid crystal cell 60 is set to be 0.15 and a cell gap d which is a gap between the first substrate 1 and the second substrate 2 is set to be 8 $\mu$m. Accordingly, the $\Delta$nd value of the first liquid crystal cell 60 which is represented by the product of the difference $\Delta$n in the birefringence of the nematic liquid crystal 6 and the cell gap d, is 1200 nm.

Alignment layers (not shown) are also formed on the respective surfaces of the first electrode 73 and the second electrode 74 of the second liquid crystal cell 62. As shown in FIG. 23, the first substrate 71 undergoes a rubbing treatment downward in the right at a 45° angle with respect to the horizontal axis H, whereby a lower molecular alignment direction 62a of liquid crystal is disposed downward to the right at a 45° angle. The second substrate 72 undergoes a rubbing treatment upward to the right at a 45° angle, whereby an upper molecular alignment direction 62b is disposed upward to the right at a 45° angle. The nematic liquid crystal has a viscosity of 20 cp. A chiral substance, which is an optical rotatory material, is added to the nematic liquid crystal. The chiral substance is added such that the twisting pitch P is adjusted to approximately 100 $\mu$m, thus forming the TN mode second liquid crystal cell 62 twisted counterclockwise at 90° angle.

A difference $\Delta$n in birefringence of the nematic liquid crystal 76 used in the second liquid crystal cell 62 is set to be 0.15 and a cell gap d which is a gap between the first substrate 71 and the second substrate 72 is set to be 8 $\mu$m.

Accordingly, a Δnd value of the second liquid crystal cell 62 which is represented by the product of the difference Δn in the birefringence of the nematic liquid crystal 76 and the cell gap d, is also 1200 nm.

Figure 22:
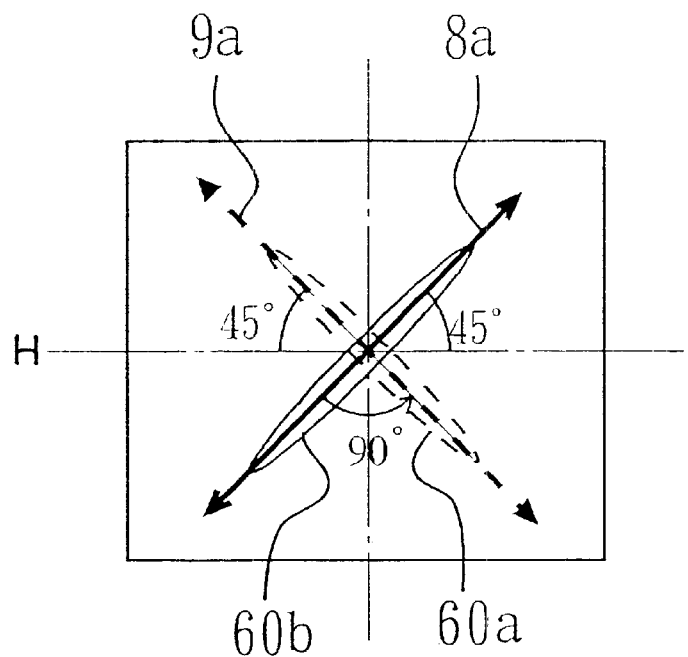
FIGS. 22 and 23 are plane views showing the positional relations between liquid crystal cells and polarizing films in the liquid crystal display device.

As shown in FIG. 22, the absorption axis 8a of the second polarizing film 8, incorporated in the first liquid crystal display device 61, is directed upward to the right at a 45° angle equivalent to that in the upper molecular alignment direction 60b of the first liquid crystal cell 60. The absorption axis 9a of the first polarizing film is directed downward to the right at a 45° angle equivalent to that in the lower molecular alignment direction 60a of the first liquid crystal cell 60. Consequently, the pair of upper and lower polarizing films 8 and 9 forms an intersecting angle of 90°.

Figure 23:
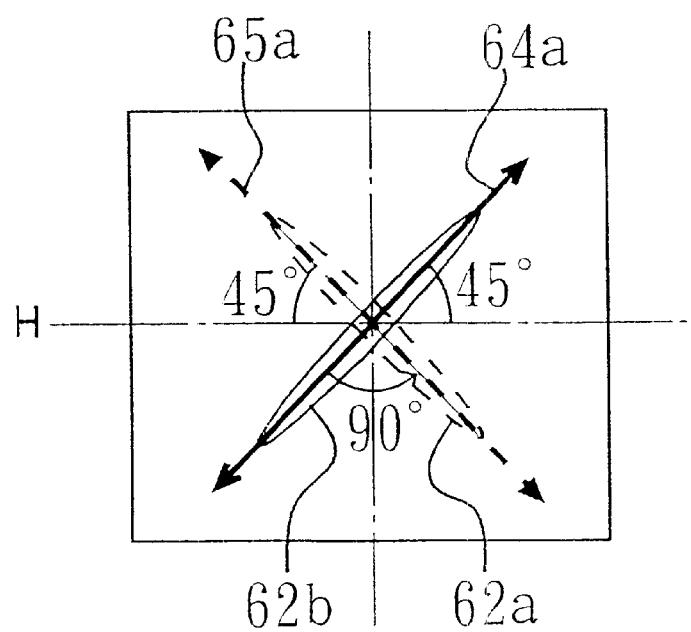

As shown in FIG. 23, an absorption axis 64a of the third polarizing film 64 incorporated in the second liquid crystal display device 62, is directed upward to the right at a 45° angle equivalent to that in the upper molecular alignment direction 62b of the second liquid crystal cell 62. A transmission axis 65a of the reflection-type polarizing film 65 is directed downward to the right at a 45° angle equivalent to that in the lower molecular alignment direction 62a of the second liquid crystal cell 62.

As for the above-described two-stage liquid crystal display device of the third embodiment, where a voltage is not applied to the second liquid crystal cell 62, after a linearly polarized light passes through the third polarizing film 64 to be transmitted from a direction orthogonal to the absorption axis 64a, it is rotated at a 90° angle by the second liquid crystal cell 62 to bear towards the reflection axis orthogonal to the transmission axis 65a of the reflection-type polarizing film 65, hence all the incident light is reflected and the display results in a silver mirror display.

When a voltage is applied across the first electrode 73 and the second electrode 74 of the second liquid crystal cell 62, molecules of the nematic liquid crystal 76 rise and the optical rotatory character of the second liquid crystal cell 62 is lost. Therefore, the linearly polarized light after passing through the third polarizing film 64 and being incident from a direction orthogonal to the absorption axis 64a, advances in a direction parallel to the transmission axis 65a of the reflection-type polarizing film 65, so that the incident light is passed through the second liquid crystal display device 63, and the shutter portion 47 shown in FIG. 20 is opened.

When opening the shutter portion 47, a transmission axis orthogonal to the absorption axis 8a of the second polarizing film in the first liquid crystal display device 61, is parallel to the transmission axis 65a of the reflection-type polarizing film 65 in the second liquid crystal display device 63, so that the linearly polarized light passed through the second liquid crystal display device 63, is incident onto the first liquid crystal display device 61.

Where a voltage is not applied to the first liquid crystal cell 60, the linearly polarized light advancing from the second polarizing film 8 is rotated at 90° angle and reaches in the transmission-axis direction orthogonal to the absorption axis 9a of the first polarizing film 9, so that the incident light passes through the first polarizing film 9. Thereafter, the incident light is reflected by the transflective reflector 11, and then again returns to pass through the first liquid crystal display device 61 and the second liquid crystal display device 63, to be emitted to the visible side, resulting in the display in a white color.

When a voltage is applied across the first electrodes 3 and the second electrodes 4 of the first liquid crystal cell 60, molecules of the nematic liquid crystal 6 rise and the optical rotatory character of the first liquid crystal cell 60 is lost. Therefore, the linearly polarized light passed through the second polarizing film 8 from a direction orthogonal to the absorption axis 8a, advances in a direction parallel to the absorption axis 9a of the first polarizing film 9, thus all the incident light is absorbed and the first liquid crystal display device displays in a black color.

A method for driving the two-stage liquid crystal display device of the third embodiment will now be explained. The driving signals used in the method are the same as those used in the first embodiment shown in FIG. 8 and FIG. 9. The first electrodes 3 in the first liquid crystal cell 60 consist of the scanning electrodes C1 to C3 as shown in FIG. 6, and the scanning signals as shown in FIG. 8 are supplied thereto. The second electrodes 4 consist of the data electrodes D1 to D20 as shown in FIG. 7, and the data signals as shown in FIG. 9 are supplied thereto so as to perform the display of time or the like.

The first electrode 73 in the second liquid crystal cell 62 consists of a scanning electrode, and the data signal for C4 shown in FIG. 8 is assigned thereto. The second electrode 74 consists of a data electrode, and receives the data signal for D1 shown in FIG. 9, whereby the combination waveform as shown in FIG. 9 is applied across the first electrode 73 and the second electrode 74, hence a voltage of 3V can be applied as an effective value.

As shown in FIG. 10, to the first liquid crystal cell 60 only Von=2.12V is applied, but to the second liquid crystal cell 62 a voltage of V3=3.0V can be applied. Accordingly, the second liquid crystal cell 62 assumes a completely opening state, resulting in a shutter characteristic with a shine and the improved viewing angle characteristic.

By supplying the data signal D5 or D9, as shown in FIG. 9, to the second electrode 74 of the second liquid crystal cell 62, the second liquid crystal display device 63 is allowed to take a half-open state, alternatively, to be controlled to gradually display time when opening or cover the time when closing.

Through driving the two-stage liquid crystal display device with a typical monochrome liquid crystal driving IC without a gray scale function, the effective voltage applied to the second liquid crystal display device 63 is allowed to be set at a value larger than that of the effective voltage applied to the first liquid crystal display device, whereby the shutter portion can assume a full open state to allow a bright display, resulting in the provision of novel portable machines, a watch or the like, for young people in which letters emerge from a metallic shutter.

Modification of the Third Embodiment

In the third embodiment, the transflective reflector 11 is used as a reflector and the backlight unit 19 is provided for visibility of the display at night. However, a reflector may be used as a dedicated type for reflection, not to employ the backlight unit 19.

While the third polarizing film 64 and the reflection-type polarizing film 65 are provided in the second liquid crystal display device 63, the second liquid crystal display device 63 may consist of only the third polarizing film 64 replacing the reflection-type polarizing film 65. Alternatively, the reflection-type polarizing film 65 may be replaced with a typical absorption type polarizing film, in which the display assumes not a mirror state, but a black or white background.

The TN liquid crystal cell having a twist angle of 90° is used for the first liquid crystal cell 60 and the second liquid crystal cell 62 in the embodiment. However, an STN liquid crystal cell having a twist angle in range from 180° to 270° can be used, or a liquid crystal display device incorporated with an STN liquid crystal cell having a retardation film or a twisted retardation film can be used.

In the embodiment, the second liquid crystal display device 63 is provided with only one shutter portion 47, but a plurality of shutter portions can be provided as a matter of course.

The embodiment has described the two-stage liquid crystal display device including the first liquid crystal display device 61 and the second liquid crystal display device 63. However, even a conventional liquid crystal display device can display with emphasis on contrast in a mark portion or an icon portion or can perform a half tone display insofar as the driving method of the liquid crystal display device according to the present invention is applied to the operation of the conventional liquid crystal display device.

Industrial Applicability

As is clear from the aforementioned description, a liquid crystal display device according to the present invention comprises a birefringence color liquid crystal display device of which a liquid crystal display portion consists of a letter display portion and a mark display portion, the mark display portion displaying in multiple colors so as to provide a colorful and fashionable display.

A multicolor display is achieved by driving the birefringence color liquid crystal display device with a typical monochrome liquid crystal driving IC without a gray scale function, thus providing portable machines capable of displaying in multiple colors with a low cost and a low power consumption.

A timepiece, comprising a two-stage liquid crystal display device in which a second liquid crystal display device is mounted on a first liquid crystal display device as explained in the third embodiment, has a high contrast on the second liquid crystal display device and is allowed to perform a half tone display, thus providing fashionable and attractive portable machines having brightness and a brightness adjusting function.

What is claimed is:

1. A liquid crystal display device, consisting of a liquid crystal cell in which nematic liquid crystal is sandwiched and filled in a gap between a transparent first substrate having first electrodes and a transparent second substrate having second electrodes and a liquid crystal driving circuit which outputs scanning signals and data signals for driving said liquid crystal display cell,
   wherein a display portion has a letter display portion and a mark display portion, and
   said liquid crystal driving circuit supplies scanning signals to said first electrodes while supplying data signals to said second electrodes in said letter display portion, and data signals to both said first electrodes and second electrodes in said mark display portion.

2. The liquid crystal display device according to claim 1, further comprising a reflector which is a transflective reflector is arranged on the outside of said liquid crystal cell, and
   a backlight unit arranged on the opposite side of said transflective reflector from said liquid crystal cell to illuminate said liquid crystal cell through said transflective reflector.

3. The liquid crystal display device according to claim 1, further comprising a pair of polarizing films arranged on and under the liquid crystal cell, and
   a retardation film arranged between said liquid crystal cell and said polarizing film positioned on the visible side.

4. The liquid crystal display device according to claim 2, further comprising a pair of polarizing films arranged on and under the liquid crystal cell, and
   a retardation film arranged between said liquid crystal cell and said polarizing film positioned on the visible side.

5. The liquid crystal display device according to claim 1, further comprising a pair of polarizing films arranged on and under the liquid crystal cell, and
   a twisted retardation film arranged between said liquid crystal cell and said polarizing film positioned on the visible side.

6. The liquid crystal display device according to claim 2, further comprising a pair of polarizing films arranged on and under the liquid crystal cell, and
   a twisted retardation film arranged between said liquid crystal cell and said polarizing film positioned on the visible side.

7. The liquid crystal display device according to claim 1, wherein said liquid crystal cell is an STN liquid crystal cell in which said nematic liquid crystal is aligned at a twist angle in the range from 180 degrees to 270 degrees, and a $\Delta$nd value which is the product of a value $\Delta$n in the birefringence of the liquid crystal and a gap d of the liquid crystal cell, ranges from 1300 nm to 1600 nm.

8. The liquid crystal display device according to claim 2, wherein said liquid crystal cell is an STN liquid crystal cell in which said nematic liquid crystal is aligned at a twist angle in the range from 180 degrees to 270 degrees, and a $\Delta$nd value which is the product of a value $\Delta$n in the birefringence of the liquid crystal and a gap d of the liquid crystal cell, ranges from 1300 nm to 1600 nm.

9. The liquid crystal display device according to claim 3, wherein said liquid crystal cell is an STN liquid crystal cell in which said nematic liquid crystal is aligned at a twist angle in the range from 180 degrees to 270 degrees, and a $\Delta$nd value which is the product of a value $\Delta$n in the birefringence of the liquid crystal and a gap d of the liquid crystal cell, ranges from 1500 nm to 1800 nm, and a retardation value of said retardation film ranges from 1600 nm to 1900 nm.

10. The liquid crystal display device according to claim 4, wherein said liquid crystal cell is an STN liquid crystal cell in which said nematic liquid crystal is aligned at a twist angle in the range from 180 degrees to 270 degrees, and a $\Delta$nd value which is the product of a value $\Delta$n in the birefringence of the liquid crystal and a gap d of the liquid crystal cell, ranges from 1500 nm to 1800 nm, and a retardation value of said retardation film ranges from 1600 nm to 1900 nm.

11. The liquid crystal display device according to claim 3, wherein said retardation film is a retardation film forming relations of nx>nz>ny, where nx is the refractive index of a phase delay axis, ny is the refractive index in a direction orthogonal to the phase delay axis, and nz is the refractive index in a thickness direction.

12. The liquid crystal display device according to claim 4, wherein said retardation film is a retardation film forming relations of nx>nz>ny, where nx is the refractive index of a phase delay axis, ny is the refractive index in a direction orthogonal to the phase delay axis, and nz is the refractive index in a thickness direction.

13. The liquid crystal display device according to claim 5, wherein said liquid crystal cell is an STN liquid crystal cell in which said nematic liquid crystal is aligned at a twist angle in the range from 180 degrees to 270 degrees, and a Δnd value which is the product of a value Δn in the birefringence of the liquid crystal and a gap d of the liquid crystal cell, ranges from 1500 nm to 1800 nm, and a Δnd value of said twisted retardation film ranges from 1400 nm to 1800 nm.

14. The liquid crystal display device according to claim 6, wherein said liquid crystal cell is an STN liquid crystal cell in which said nematic liquid crystal is aligned at a twist angle in the range from 180 degrees to 270 degrees, and a Δnd value which is the product of a value Δn in the birefringence of the liquid crystal and a gap d of the liquid crystal cell, ranges from 1500 nm to 1800 nm, and a Δnd value of said twisted retardation film ranges from 1400 nm to 1800 nm.

15. A liquid crystal display device, comprising:

a first liquid crystal cell in which nematic liquid crystal is sandwiched and filled in a gap between a transparent first substrate having first electrodes and a transparent second substrate having second electrodes;

a second liquid crystal cell in which nematic liquid crystal is sandwiched and filled in a gap between a transparent first substrate having a first electrode and a transparent second substrate having a second electrode, arranged on a visible side to the first liquid crystal cell; and a liquid crystal driving circuit which outputs scanning signals and data signals for driving said first and second liquid crystal display cells, wherein a liquid crystal driving circuit is a circuit for supplying said scanning signals to said first electrodes of said first liquid crystal cell, said data signals to said second electrodes of said first liquid crystal cell, and said data signals to both said first electrode and said second electrode of said second crystal liquid cell.

16. A liquid crystal display device comprising:

a first liquid crystal display device consisting of a first liquid crystal cell in which nematic liquid crystal is sandwiched and filled in a gap between a transparent first substrate having first electrodes and a transparent second substrate having second electrodes, a pair of polarizing films respectively arranged on and under the first liquid crystal cell, and a reflector arranged on a face of one of the polarizing films, the face being on the opposite side to said liquid crystal cell;

a second liquid crystal display device arranged on the visible side of said first liquid crystal display device, and consisting of a second liquid crystal cell in which nematic liquid crystal is sandwiched and filled in a gap between a transparent first substrate having first electrode and a transparent second substrate having a second electrode, a third polarizing film arranged on a face of the second liquid crystal cell on the visible side, and a reflection-type polarizing film arranged on the opposite side of said second liquid crystal cell from the visible side; and a liquid crystal driving circuit for driving said first and second liquid crystal cells to supply scanning signals to said first electrodes of said first liquid crystal cell, data signals to said second electrodes of said first liquid crystal cell, and data signals to said first electrode and said second electrode of said second crystal liquid cell.

17. A method for driving a liquid crystal display device, comprising a liquid crystal cell in which nematic liquid crystal is sandwiched and filled in a gap between a transparent first substrate having first electrodes and a transparent second substrate having second electrodes, a liquid crystal driving circuit which outputs scanning signals and data signals for driving said crystal display cell, wherein a display portion of said liquid crystal display device has a letter display portion and a mark display portion, said method comprising steps of:

supplying scanning signals to said first electrodes while supplying data signals to said second electrodes in said mark display portion for displaying a single color; and supplying data signals to both said first electrode and second electrode in said mark display portion for displaying in a plurality of colors.

18. A method for driving a liquid crystal display device, comprising a first liquid crystal cell in which nematic liquid crystal is sandwiched and filled in a gap between a transparent first substrate having first electrodes and a transparent second substrate having second electrodes,;

a second liquid crystal cell in which nematic liquid crystal is sandwiched and filled in a gap between a transparent first substrate having a first electrode and a transparent second substrate having a second electrode, arranged on a visible side of the first liquid crystal, and a liquid crystal driving circuit which outputs scanning signals and data signals for driving said first and second crystal display cells, said method comprising steps of:

supplying scanning signals to said first electrodes of said first liquid crystal cell while supplying data signals to said second electrodes thereof; for displaying a single color; and supplying data signals to both said first electrode and said second electrode of said second liquid crystal cell for displaying in a plurality of colors.

19. The liquid crystal display device according to claim 1, wherein said letter display portion is a display portion displaying in a single color, and said mark display portion is a display portion displaying in a plurality of colors.

20. The liquid crystal display device according to claim 2, wherein said letter display portion is a display portion displaying in a single color, and said mark display portion is a display portion displaying in a plurality of colors.

* * * * *